(12) United States Patent
Woodard et al.

(10) Patent No.: US 10,145,140 B2
(45) Date of Patent: Dec. 4, 2018

(54) RECREATIONAL VEHICLE BED TOP

(71) Applicant: Anthony Glenn Woodard, Petal, MS (US)

(72) Inventors: Anthony Glenn Woodard, Petal, MS (US); William Carey West, Tuscaloosa, AL (US)

(*) Notice: Subject to any disclaimer, the term of this patent is extended or adjusted under 35 U.S.C. 154(b) by 0 days.

(21) Appl. No.: 14/927,750

(22) Filed: Oct. 30, 2015

(65) Prior Publication Data
US 2016/0348393 A1 Dec. 1, 2016

Related U.S. Application Data

(60) Provisional application No. 62/167,611, filed on May 28, 2015.

(51) Int. Cl.
*E04H 15/06* (2006.01)
*E04H 15/30* (2006.01)
*B60P 7/04* (2006.01)
*B60J 7/10* (2006.01)

(52) U.S. Cl.
CPC .............. *E04H 15/06* (2013.01); *B60J 7/102* (2013.01); *B60P 7/04* (2013.01); *E04H 15/30* (2013.01)

(58) Field of Classification Search
CPC ............. E04H 15/46; E04H 15/06; B60P 7/04
USPC ................... 135/88.01, 88.05, 88.13, 88.15; 296/100.16, 100.17, 100.18
See application file for complete search history.

(56) References Cited

U.S. PATENT DOCUMENTS

| 2,618,285 | A | * | 11/1952 | Heisig | A45B 11/00 114/361 |
| 3,032,046 | A | * | 5/1962 | Coonradt | B63B 17/02 114/361 |
| 3,929,147 | A | * | 12/1975 | Roscoe | E04H 15/06 135/140 |
| 4,519,409 | A | * | 5/1985 | Kinney | B60P 3/343 135/88.08 |
| 5,579,797 | A | * | 12/1996 | Rogers | A45B 11/00 135/88.01 |
| 5,601,104 | A | * | 2/1997 | Perkins | E04H 15/06 135/88.03 |
| 5,660,425 | A | * | 8/1997 | Weber | E04H 15/06 135/88.01 |
| 6,155,279 | A | * | 12/2000 | Humphrey | B60P 3/32 135/87 |
| 6,202,664 | B1 | * | 3/2001 | Shenton, Jr. | E04H 15/06 135/88.01 |
| 6,394,118 | B1 | * | 5/2002 | Cikanowick | E04H 15/06 135/115 |

(Continued)

*Primary Examiner* — Noah Chandler Hawk

(57) ABSTRACT

A bed top having a canopy frame with left and right rear telescopic supports mounted in a bed of a recreational vehicle. The canopy frame may be covered with a canopy or tarp to provide cover for the bed, and the canopy frame and canopy can be rotated 180 degrees forming a shade off the bed of the vehicle, or the canopy frame can be removed from the vehicle and left and right front telescopic supports placed under a left front corner and a right front corner, respectively, and the canopy frame covered with a tarp forming an enclosure that can be used as a hunting blind. A length adjusting means and a width adjusting means may be integrated in the canopy frame to adapt to varying bed sizes. The bed top may also include left and right leg mounts for the left and right rear telescopic supports, respectively.

13 Claims, 43 Drawing Sheets

(56) References Cited

U.S. PATENT DOCUMENTS

| | | | | |
|---|---|---|---|---|
| 6,725,807 B1* | 4/2004 | Tapia | ............ | A01K 1/0272 |
| | | | | 119/482 |
| 6,824,192 B2* | 11/2004 | Hoffmann | ............ | B60J 7/10 |
| | | | | 296/100.18 |
| 7,021,694 B1* | 4/2006 | Roberts | ............ | B60J 7/102 |
| | | | | 135/88.13 |
| 7,568,491 B2* | 8/2009 | Banfill | ............ | E04H 15/06 |
| | | | | 135/117 |
| 8,789,548 B2* | 7/2014 | Atherton | ............ | E04H 15/06 |
| | | | | 135/121 |
| 9,194,152 B1* | 11/2015 | Plasencia | ............ | E04H 15/06 |
| 2003/0101677 A1* | 6/2003 | Hewett | ............ | E04H 15/06 |
| | | | | 52/655.1 |
| 2006/0107983 A1* | 5/2006 | Froncek | ............ | E04H 15/001 |
| | | | | 135/88.15 |
| 2008/0106115 A1 | 5/2008 | Hughes | | |
| 2011/0108076 A1* | 5/2011 | Connot | ............ | E04H 15/06 |
| | | | | 135/88.05 |
| 2011/0226297 A1* | 9/2011 | Rewis | ............ | E04H 15/06 |
| | | | | 135/88.05 |
| 2012/0306232 A1* | 12/2012 | Shumaker | ............ | E04H 15/06 |
| | | | | 296/136.07 |

* cited by examiner

RECREATIONAL VEHICLE BED TOP

CROSS-REFERENCE TO RELATED APPLICATIONS

This application claims the benefit of U.S. Provisional Application No. 62/167,611, Recreational Bed top, filed May 28, 2015.

FEDERALLY SPONSORED RESEARCH

Not applicable.

BACKGROUND OF THE INVENTION

1. Field of the Invention

The present invention relates to recreational vehicle accessories and more particularly to a bed top that: can provide a cover over a vehicle bed, can be rotated 180 degrees to provide a shade, or can be removed from the vehicle bed and transformed into a hunting blind.

In the recreational vehicles industry, there is a wide variety of three wheeled and four-wheeled vehicles, such as the four-wheeled Polaris Ranger from Polaris Industries, Inc., the Yamaha Rhino from Yamaha Motor Corporation, and the Arctic Cat Prowler from Arctic Cat Inc, and the Can-Am Commander by Bombardier Recreational Products. Each of the aforementioned vehicles has a vehicle bed open to elements of the environment.

2. Description of the Related Art

Generally, prior art recreational vehicle cab canopies such as the one in patent application US2008/0106115 are designed to cover the vehicle seating area but not the bed. Bed Canopies that are available are generally fixed and not capable of being rotated and used as a shade off the back of the vehicle, and there are generally not provisions for these bed canopies to be used in a stand-alone configuration without the vehicle.

Various after-market accessories are generally available for recreational vehicles of such type, including customization kits commercialized by various manufacturers. In the design, manufacture and commercialization of such after-market accessory products, it is useful to develop accessories which are useful and versatile. Recreational vehicles in many cases are originally manufactured with open bed compartments, and when such vehicles are used, the bed and any contents are exposed to the elements, including sunlight, dirt, gravel, debris, decaying tree limbs, and leaves. Recreational vehicle after-market accessories should therefore include accessories that that offer some protection for the bed and any contents and are further adaptable for other uses when the vehicle is stationary and also in instances where the protection of the bed contents is not desired. An example would be accessories that enhance the protection of the recreational vehicle's bed contents and are also useful for other purposes, such as a shade or hunting blind.

SUMMARY OF THE INVENTION

The present invention relates to recreational vehicle accessories and more particularly to a bed top capable of being used to: provide cover for the vehicle's bed and any contents while the vehicle is in motion, rotated 180 degree to serve as a shade off the back of the vehicle, or removed from the vehicle bed and used in a stand-alone configuration for cover, such as being used as a hunting blind. Although the bet top is discussed in reference to recreational vehicles, the bed top is adaptable to any bed or platform, such as those found on pickup trucks and cargo trailers.

In one aspect, the invention relates to a bed top, adapted for mounting on the bed of a recreational vehicle, with the bed top comprising a canopy frame and a canopy that may be secured to the frame and mounted on the recreational vehicle.

A still further aspect of the invention relates to transforming the bed top that includes the canopy frame and the canopy into a shade off the rear (i.e., back) of the vehicle by rotating the frame and attached canopy 180 degrees.

A still further aspect of the invention relates to removing the bed top that includes the frame from the vehicle and adding front telescopic supports so that the bed top is transformed into a stand-alone frame to which a tarp or other cover can be added to form an enclosure, such as a hunting blind.

Other aspects, features and embodiments of the invention will be more fully apparent from the ensuing disclosure and appended claims.

DETAILED DESCRIPTION OF THE INVENTION

Figure 1:
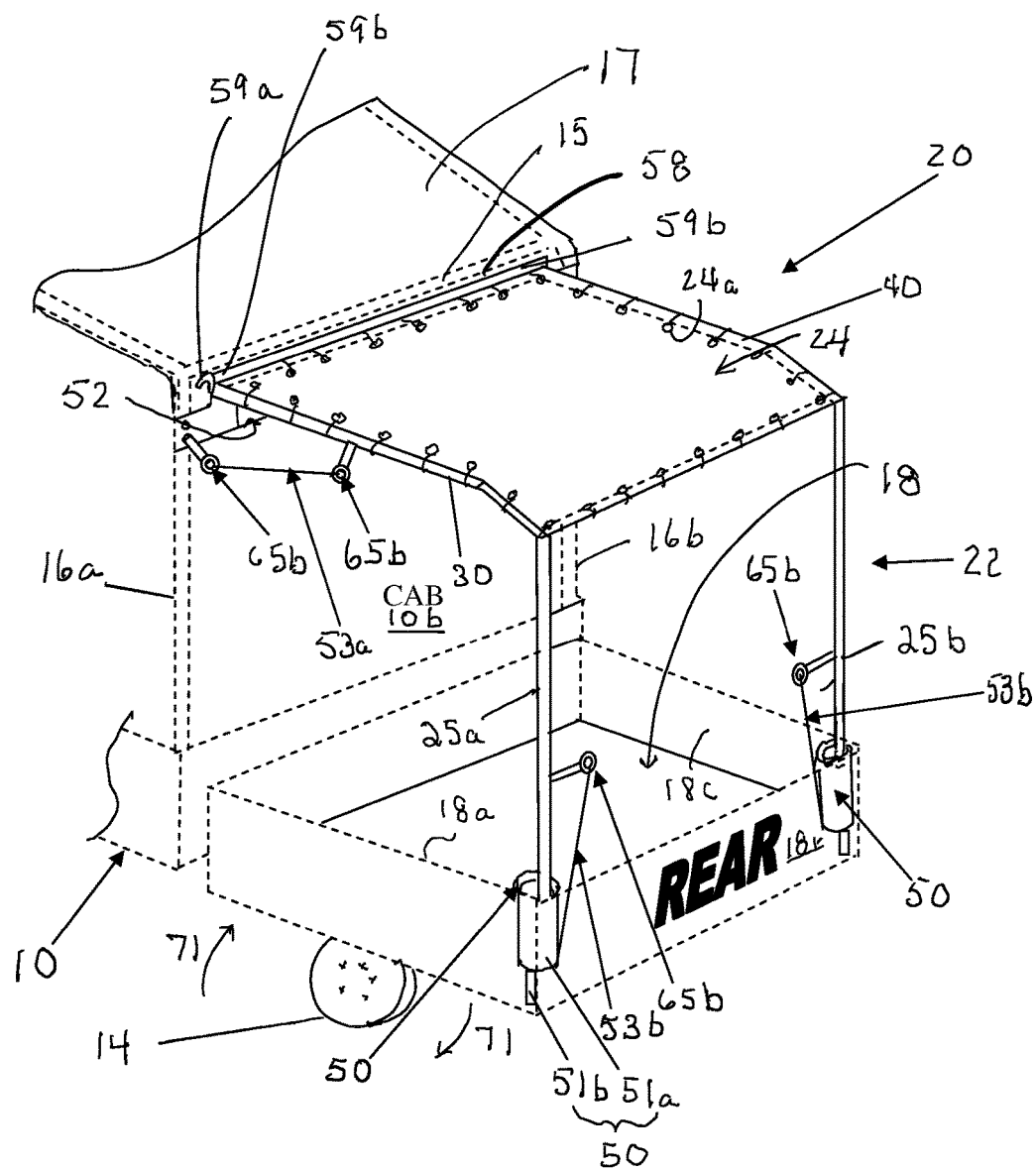
FIG. 1 is a rear (i.e., back) perspective view of a recreational vehicle bed and the bed top

Referring now to the drawings, FIG. 1 is a rear (i.e. back) perspective view of a recreational vehicle 10 generally shown in dashed lines. The recreational vehicle 10 may have least two rear wheels, such as a rear wheel 14, a cab roll cage, such as roll cage 15, with a left rear vertical cage bar 16a and right rear vertical cage bar 16b, and a cap top, such cab top 17 shown in solid lines, and a vehicle bed 18. The vehicle bed 18 may be modified with a bed top 20 that is one embodiment thereof of the present invention. The recreational vehicle 10 can be of any suitable type, such as the aforementioned Yamaha Rhino, commercially available from Yamaha Motor Corporation, the Polaris Ranger, commercially available from Polaris Industries, Inc., the Arctic Cat Prowler, commercially available from Arctic Cat Inc., and the Can-am.

Figure 2:
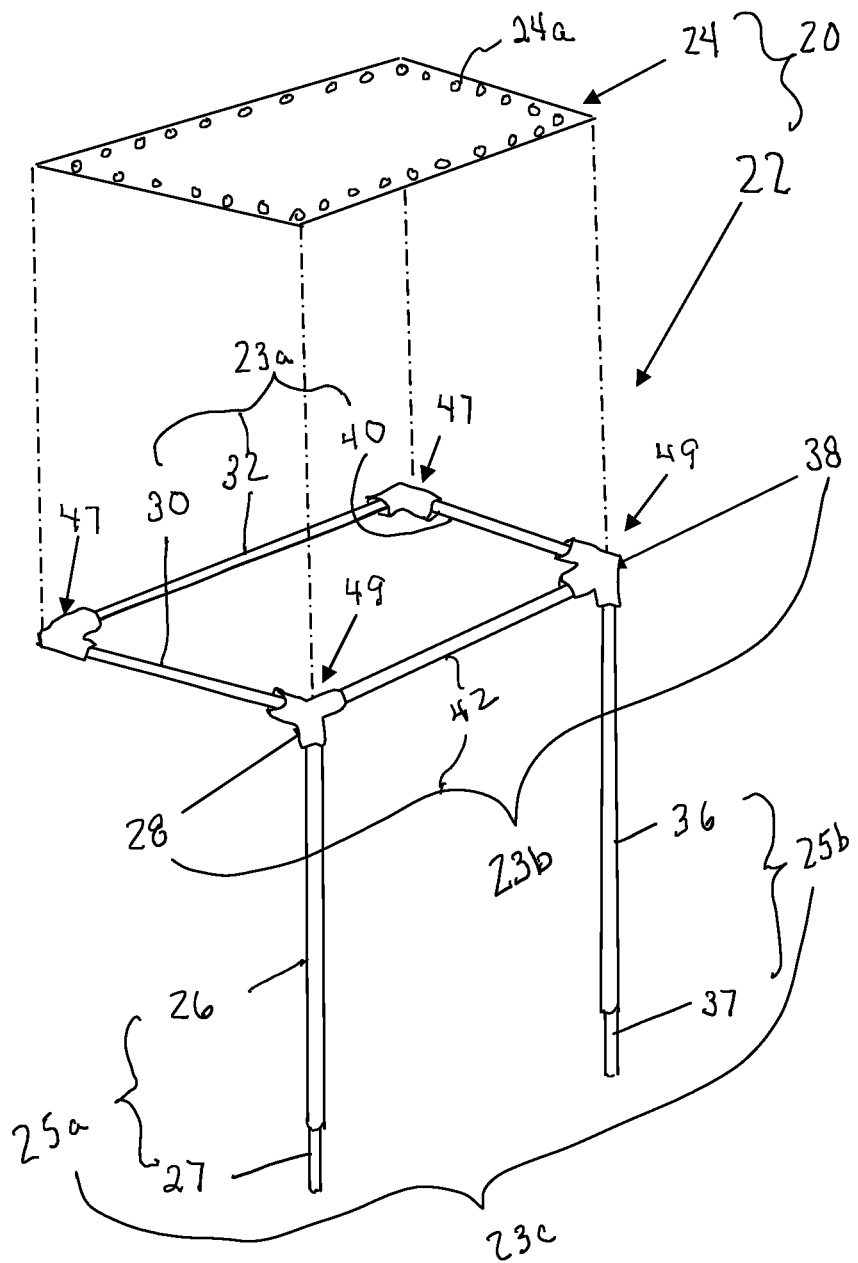
FIG. 2 is a perspective view of a canopy and a canopy frame with one arch bar
Figure 3A:
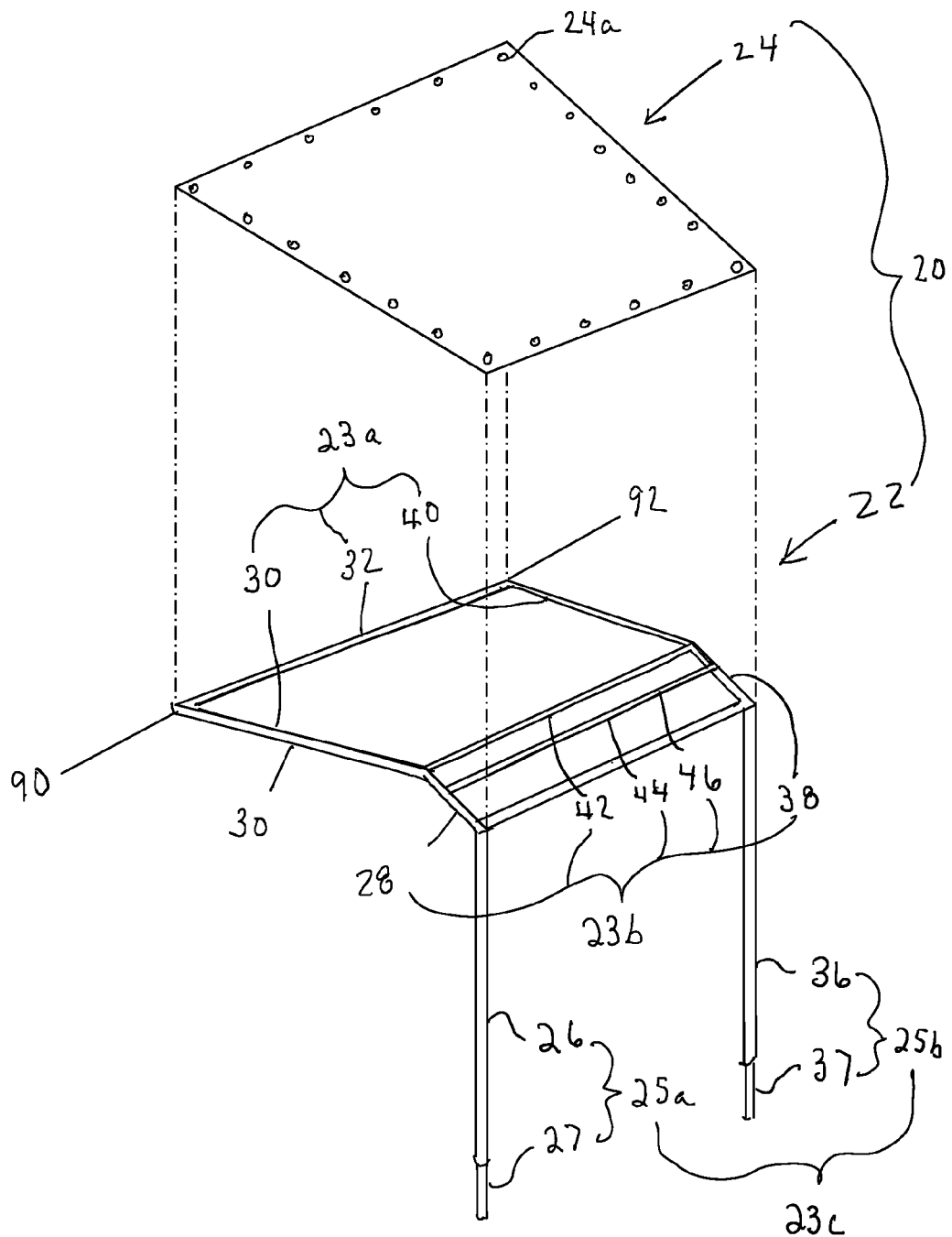
FIG. 3A is a prospective view of the canopy and a canopy frame of the with three arch bars

Looking at FIGS. 1, and 2, and more particularly FIG. 3a, the bed top 20 comprises canopy frame 22 and a canopy 24. The canopy 24 may have a plurality of tie down apertures, such as eyelets 24a, and may be formed of materials including a thermoplastic materials and canvas materials, or the canopy 24 may be a tarp with eyelets 24a commonly sold at stores selling hunting and other sporting goods. The canopy frame 22 further comprises a top portion 23a, an arch portion 23b, and a rear portion 23c. The arch portion 23b connects the top portion 23a to the rear portion 23c, and the top portion 23a is cantilevered from the arch portion 23b. The top portion 23a further comprises a left side top portion 30, a top front portion 32, and a right side top portion 40. The arch portion 23b further may comprise a left side arch portion 28, right side arch portion 38, and at least one arch bar, but preferably three arch bars, such as a first arch bar 42, a second arch bar 44, and a third arch bar 46. The rear portion 23c further comprises a left rear telescopic support 25a having a left leg 26 and a left leg extension 27, and a right rear telescopic support 25b having a right leg 36 and a right leg extension 37. Where the arch portion 23b comprises only one arch bar, such as the first arch bar 42, the left side arch portion 28 and the right side arch portion 38 may be a 90 degree three way pipe fitting 49 as shown in FIG. 2.

The canopy frame 22 may be made of a plastic, such as polyvinyl chloride (PVC), a wood, such as oak, or may be made of aluminum, steel, or a composite material, or other material that is at least structurally sufficient to hold the canopy 24. Looking again at FIG. 1, the bed top 20 may be mounted to the vehicle bed 18 using a rear mounting means, such as leg mounts 50, and a front mounting means, such as a front mounting system 52. The leg mounts 50 each are sized and configured to accept the left rear telescopic support 25a and the right rear telescopic support 25b. Looking again to FIG. 1, the directional references of "left and right" are relative to an individual standing against the rear 18r of the recreational vehicle 10 facing the cab 10b of the vehicle 10 when the invention is mounted on the vehicle bed 18 and retain the relationship when the canopy frame 22 is removed from the vehicle bed 18 and used in a stand-alone configuration with the individual's head between the left rear telescopic support 25a and the right rear telescopic support 25b and the individual looking toward the front of the invention, such as looking at the top front portion 32 shown in FIG. 3A. Looking at FIG. 1, a key feature of the bed top 20 is that it may be easily secured to the vehicle bed 18 by a securing means, such as front elastic cords 53a and the rear elastic cords 53b, and the bed top 20 may be easily removed from the vehicle bed 18 or rotated on the vehicle bed 18 by removing the front 53a and rear 53b elastic cords. The rear elastic cords 53b may be secured to the rear leg mounts 50 and an eyebolt 65b that is mounted in each of the left leg 26 and the right leg 36, and the front elastic cords 53a may be attached the front mounting system 52 and to parts of the canopy frame 22, such as the eyebolt 65b attached to left side top portion 30. Where the vehicle bed 18 is capable of tilting up, such as the vehicle bed 18 in FIG. 1 tilting in a tilt direction 71, the titling can be accomplished without removing the bed top 20 by removing the front elastic cords 53a attached to the eyebolts 65b secured to the front mounting system 52.

Figure 3B:
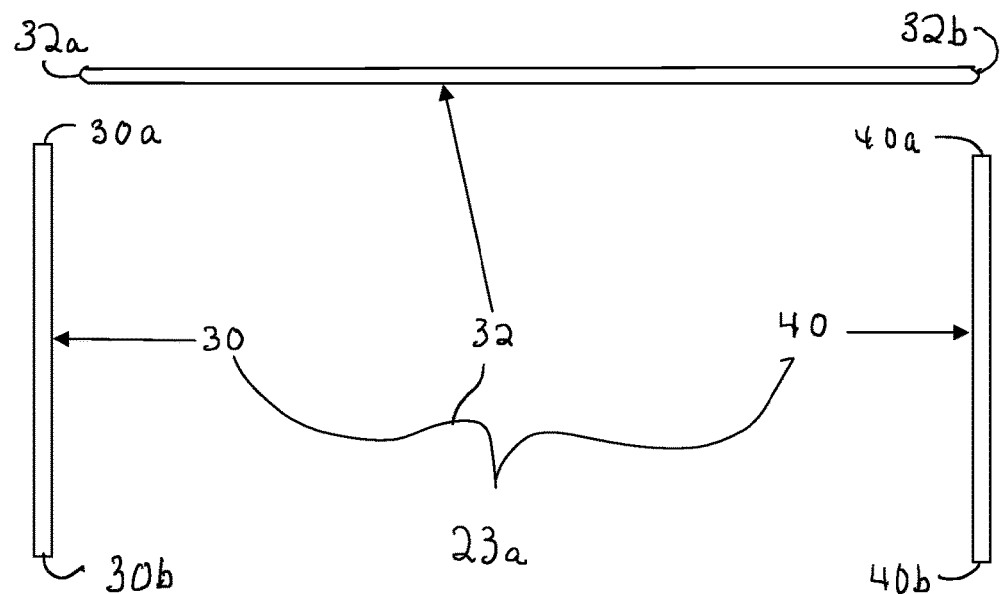
FIG. 3B shows a top view of components of a top portion and an arch portion of the canopy frame FIG. 3C provides a rear view of components of a rear portion of the canopy frame
Figure 3B:
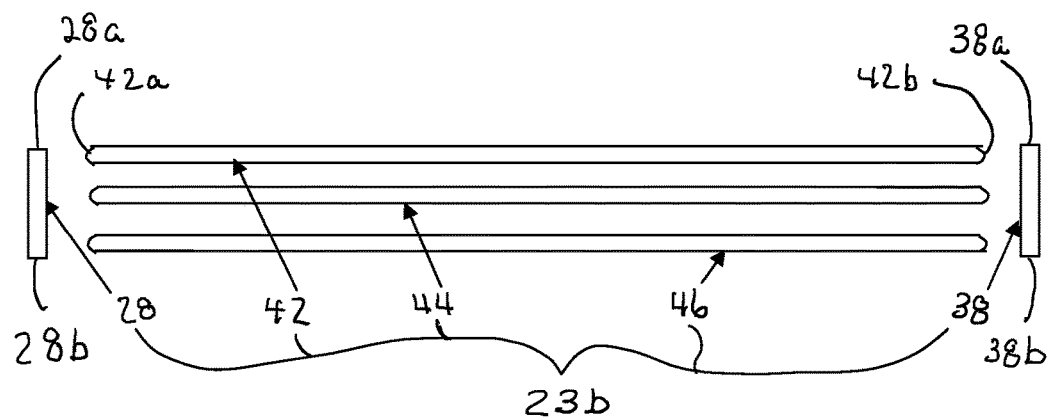
Figure 3C:
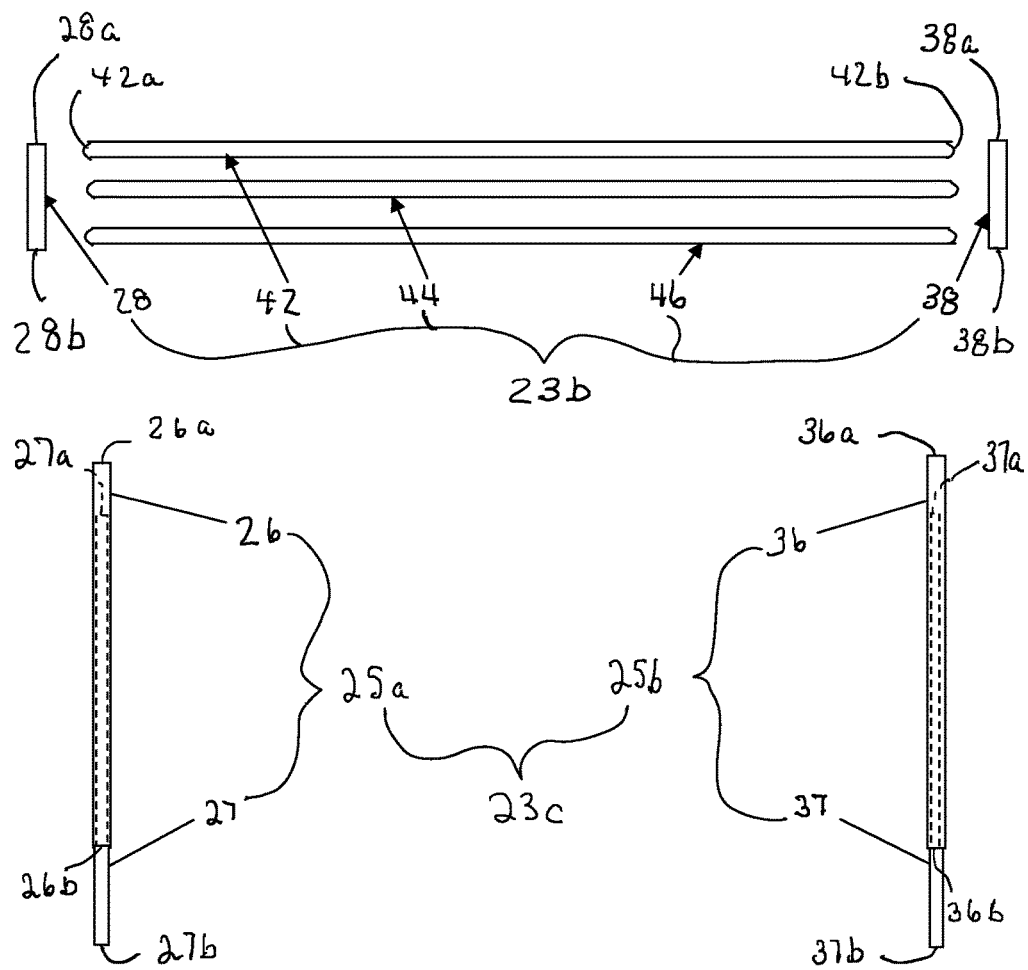
FIG. 3D shows a left side view of the canopy frame
FIG. 3E shows a prospective view of the fittings canopy frame assembled with fittings
FIG. 3F shows a rear view of the canopy frame assembled using fittings
FIG. 3G shows a top view of the canopy frame assembled using fittings
FIG. 3H shows a left side view of the canopy frame assembled using fittings
Figure 3D:
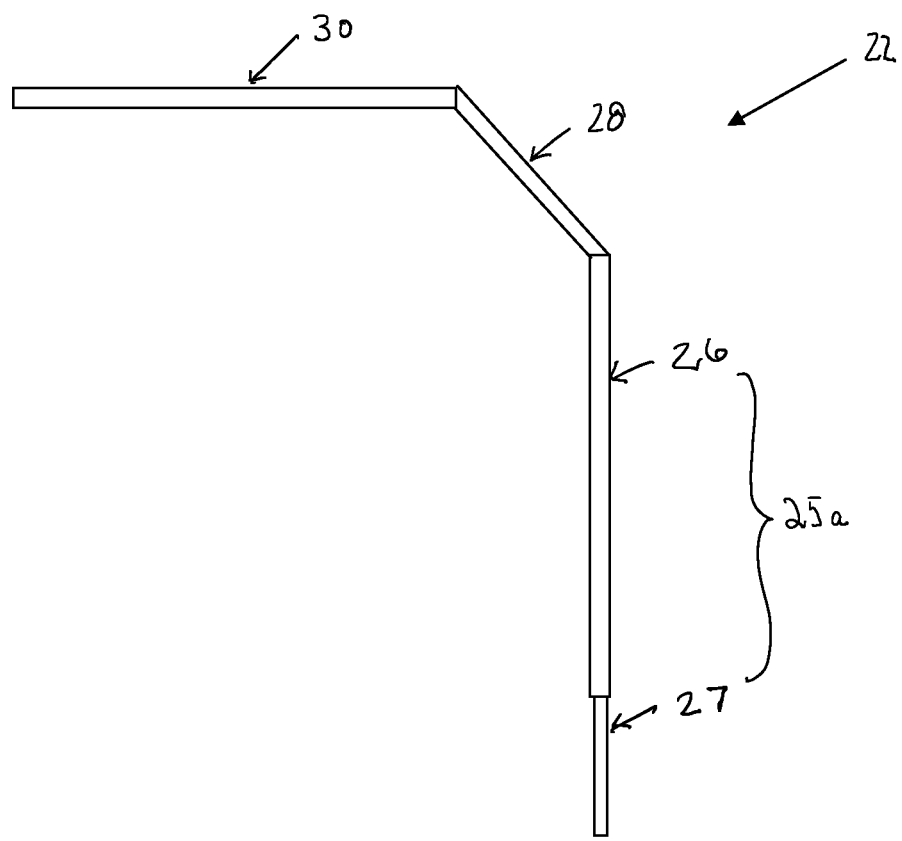
Figure 3E:
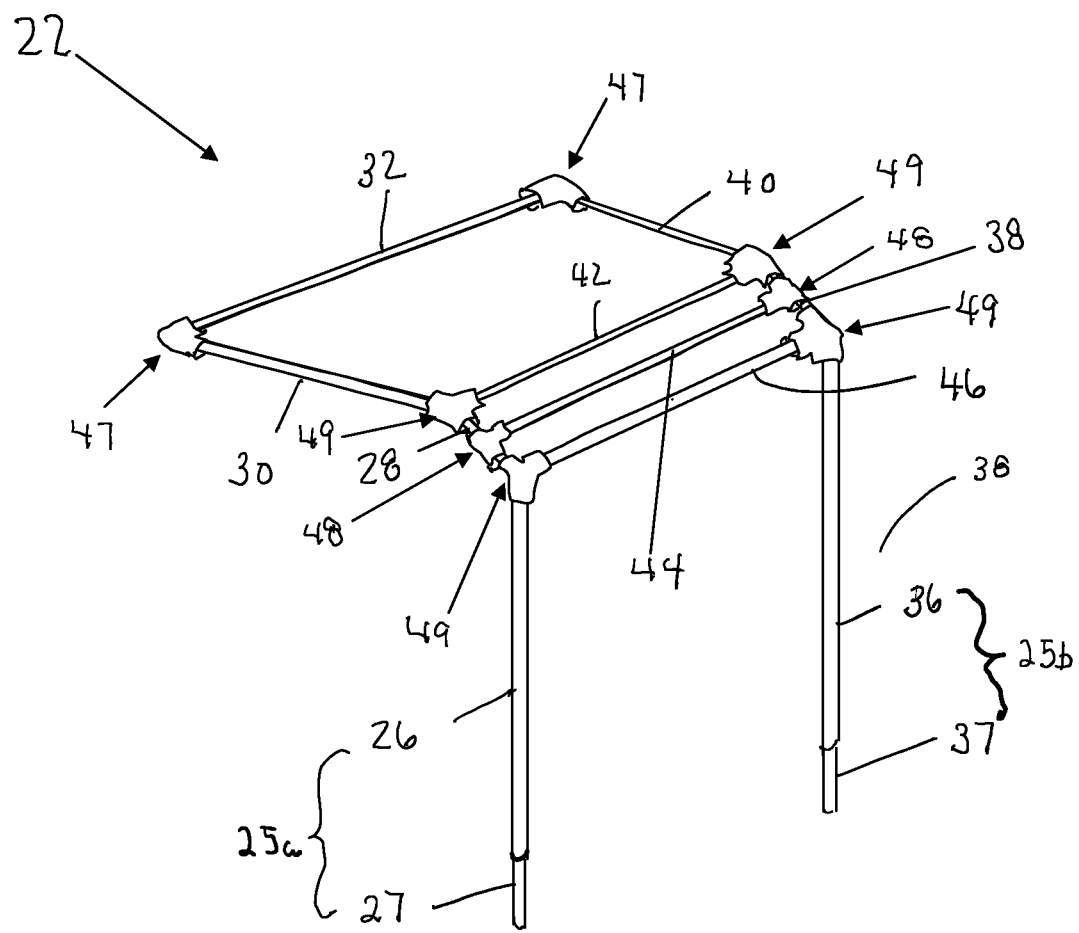
Figure 3F:
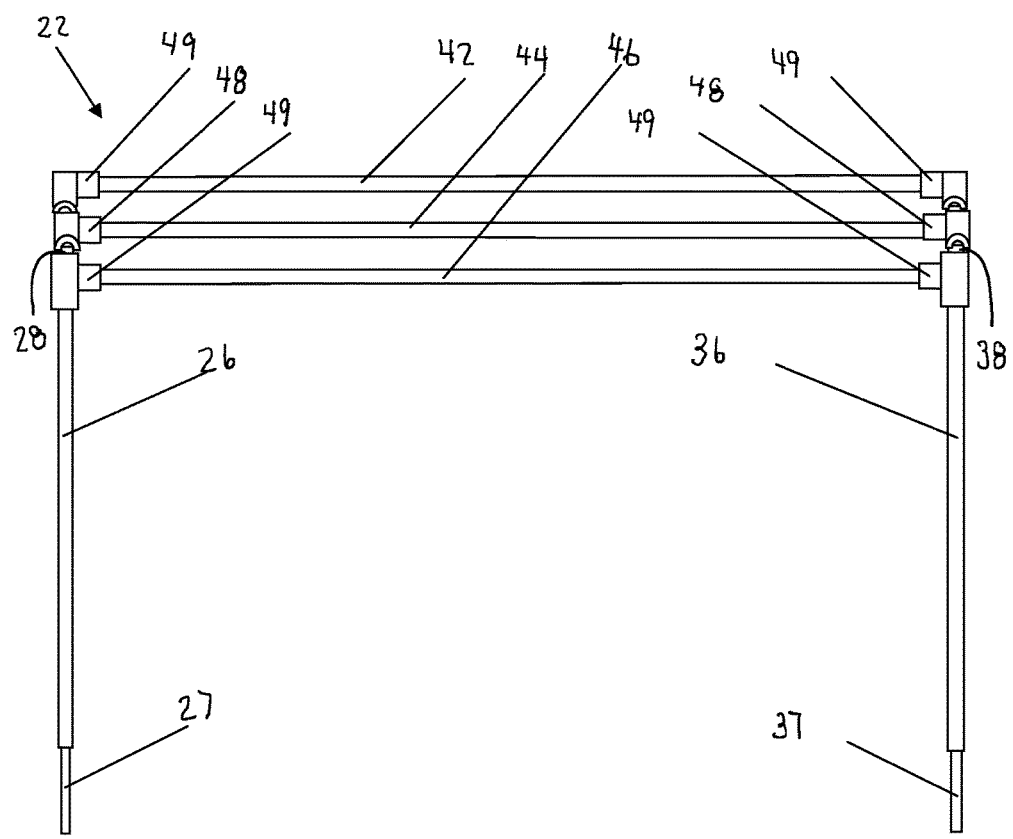
Figure 3G:
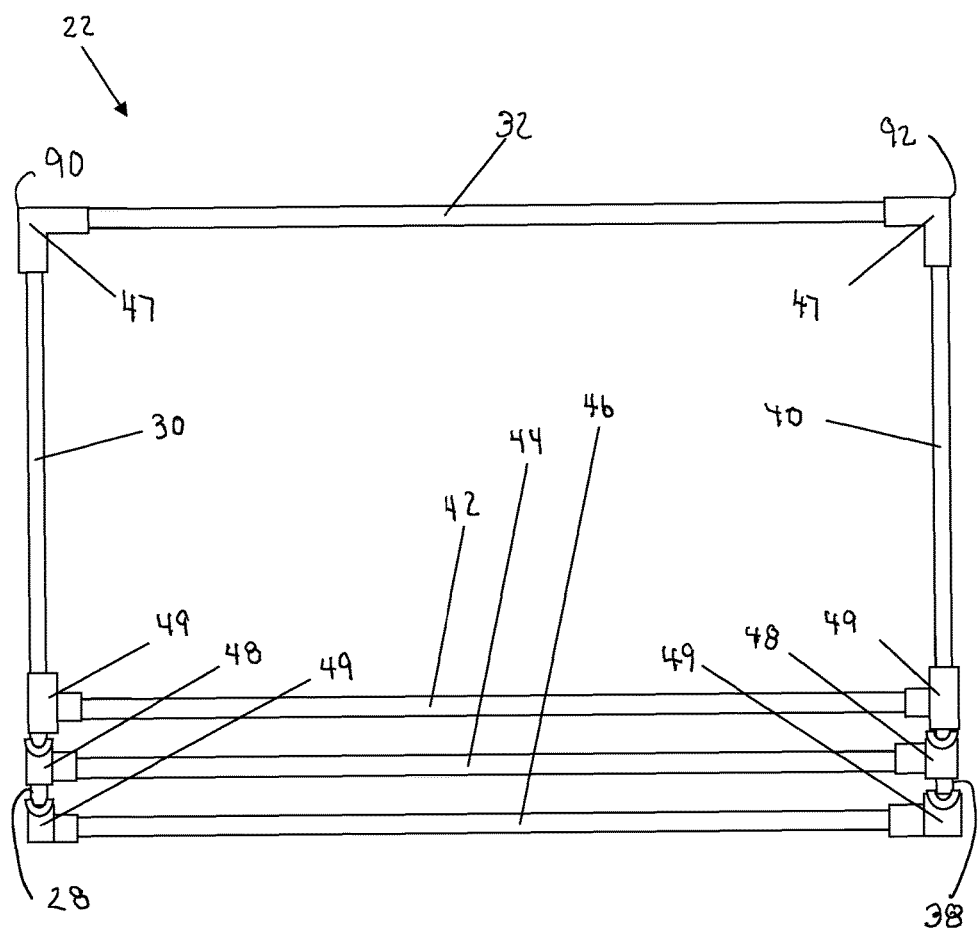
Figure 3H:
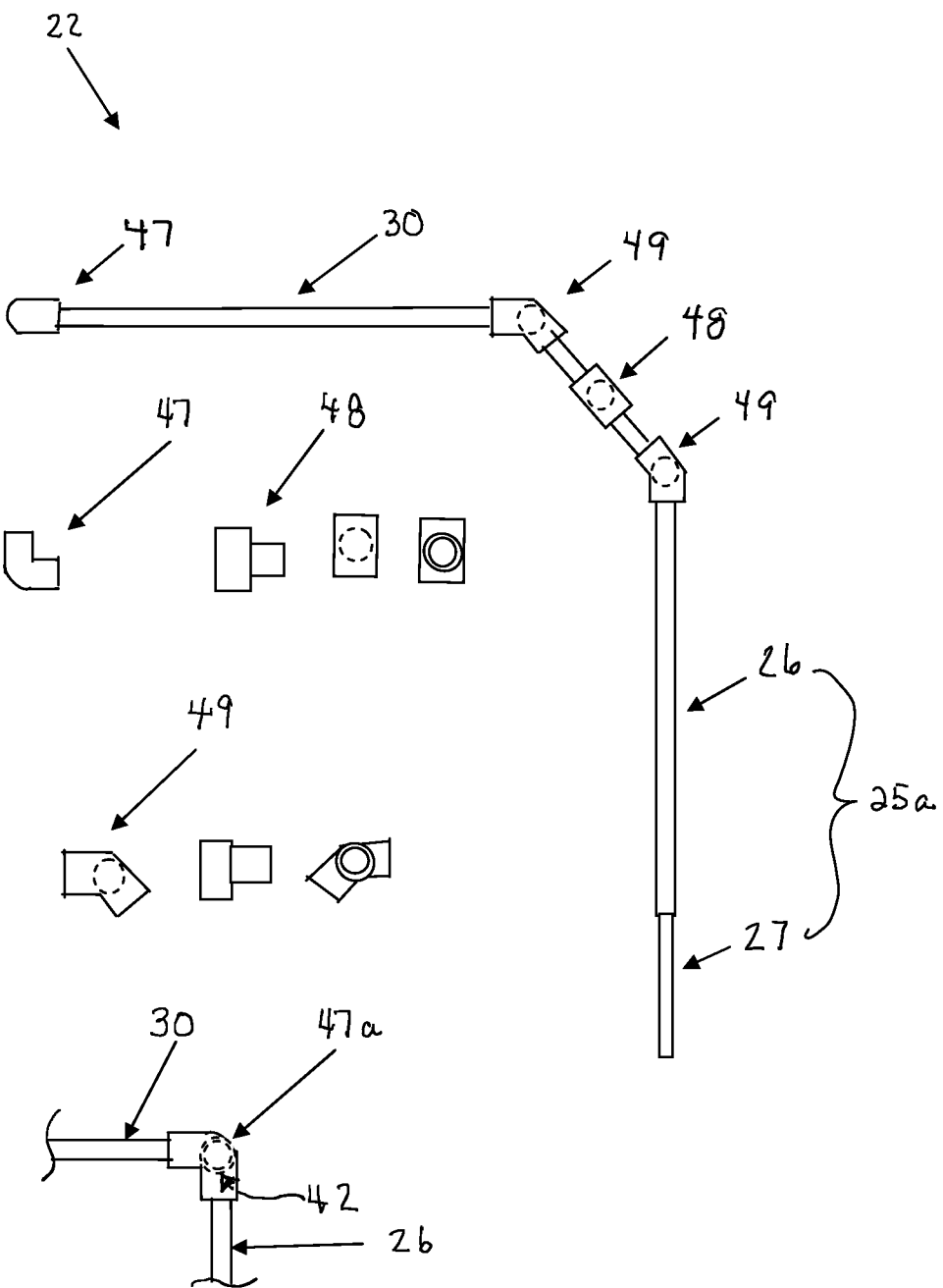

FIG. 3B shows a top view of the top portion 23a comprising the left side top portion 30, the top front portion 32, and a right side top portion 40, and FIG. 3B also shows the arch portion 23b comprising the left side arch portion 28, the right side arch portion 38, a first arch bar 42, a second 44 arch bar and a third 46 arch bar. FIG. 3C provides a rear view of the arch portion 23b and also a rear view of the rear portion 23c comprising the left rear telescopic support 25a and the right rear telescopic support 25b. FIG. 3D shows a left side view of the canopy frame 22 showing the left side top portion 30, the left side arch portion 28, and the left rear telescopic support 25a with the left leg 26 and the left leg extension 27. The parts of the canopy frame 22, may be connected to each other by a frame fastening means such as an adhesive, welds, or fittings, such as pipe fittings. FIG. 3E shows a prospective view of the canopy frame 22 assembled with the fittings, such as 90 degree elbows 47, tees 48, and three-way connectors 49. FIG. 3F shows a rear view of the canopy frame 22 assembled using the tees 48 and the three-way connectors 49. FIG. 3G shows a top of the canopy frame 22 assembled using the 90 degree elbows, the tees 48 and the three way connectors 49. FIG. 3H shows a left side view of the canopy frame 22 assembled using the 90 degree elbow 47, the tee 48, and the three-way connectors 49. The arch portion 23b may comprise the adjustable first arch bar 142 connected to the left side arch portion 28 and the right side arch portion 38 that are a single ninety degree three-way fitting 47a. Looking at FIG. 3C, the left leg 26 is connected to a left side arch portion second end 28b of the left side arch portion 28, and looking at FIG. 3B, a left side top portion second end 30b of the left side top portion 30 is connected to a left side arch portion first end 28a of left side arch portion 28. Looking at 3B and 3G, a left side top portion first end 30a of the left side top portion 30 is connected to a top front portion first end 32a of the top front portion 32 forming a left front corner 90 and a top front portion second end 32b of the top front portion 32 is connected to a right side top portion first end 40a of the right side top portion 40 forming a right front corner 92. A right side top portion second end 40b of the right side top portion 40 is connected to a right side arch portion first end 38a of right side arch portion 38 and looking at FIG. 3C, a right side arch portion second end 38b of the right side arch portion 38 is connected to a right leg first end 36a of the right leg 36.

Looking again to FIG. 3C, a first arch bar first end 42a of the first arch bar 42 is connected to the left side arch portion 28, and a first arch bar second end 42b of the first arch bar 42 is connected to the right side arch portion 38. The second 44 and third 46 arch bars are connected to left side arch portion 28 and the right side arch portion 38 in a similar manner with the first arch bar 42, the second arch bar 44, and the third arch bar 46 being generally perpendicular to the left side arch portion 28 and the right side arch portion 38.

Looking at FIG. 3A, the top front portion 32 is somewhat parallel to the first arch bar 42, and the first arch bar is generally parallel to the second 44 and the third 46 arch bars. The left side top portion 30 and the right side top portion 40 are generally are generally perpendicular to the top front portion 32.The plane formed by the left side top portion 30, the right side top portion 40, and the top front portion 32 is generally perpendicular to the plane formed by the left rear telescopic support 25a and the right rear telescopic support 25b. Looking at FIG. 3C, the left leg 26 has a left leg first end 26a and a left leg second end 26b. The right leg 36 has a right leg first end 36a and a right leg second end 36b. The left leg extension 27 has a left leg extension first end 27a inserted in the left leg second end 26b forming the left rear telescopic support 25a. The right leg extension 37 has a right leg extension first end 37a inserted in the right leg second end 36b forming the right rear telescopic support 25b.

Figure 4A:
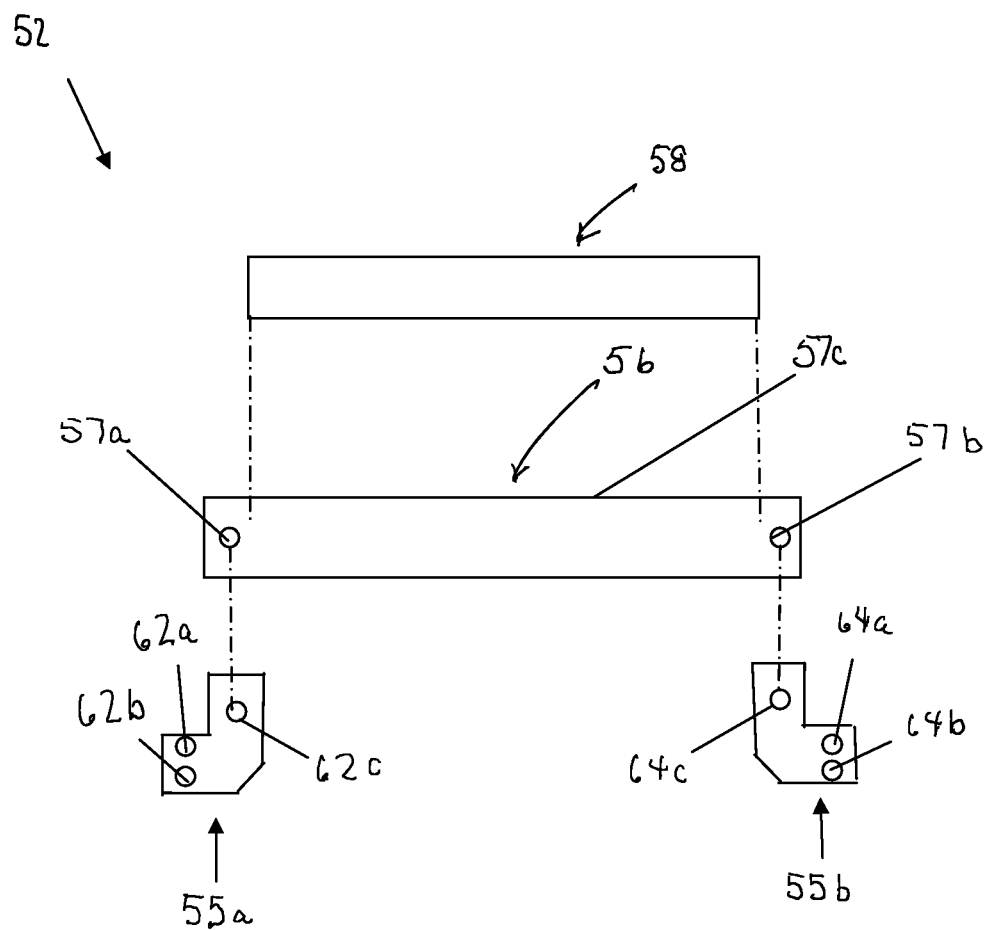
FIG. 4A is a view of the parts associated with a front mounting system

Looking again to FIG. 1, the front mounting system 52 may be used to secure the bed top 20 to the roll cage 15 that includes the left rear vertical cage bar 16a and the right rear vertical cage bar 16b . Looking to FIGS. 4A and 4B, the front mounting system 52 may comprise a first 55a and a second 55b cab mount bracket, a mount rail 56, and a rain seal 58. Looking at FIGS. 4B and 4C, the first cab mount bracket 55a is mounted to the left rear vertical cage bar 16a of the roll cage 15 and the second cab mount bracket 55b is mounted to the right rear vertical cage bar 16b of the roll cage 15. The mount rail 56 may be a single element sized to fit the particular recreational vehicle 10. The mount rail 56 may have a left rail hole 57a and a right rail hole 57b, and a mount rail top edge 57c. Looking at FIG. 4C, the rain seal 58 comprises a front rubberized portion 59a joined to a back rubberized potion 59b, and the rain seal 58 may be cut to conform to a length somewhat less than the length of the mount rail 56. Looking again at FIGS. 4A and 4B, the rain seal 58 is placed over the mount rail top edge 57c of the mount rail 56, and looking at FIG. 1, the front rubberized portion 59a is adjacent to the vehicle cap top 17 and the back rubberized portion 59b is adjacent to the canopy 24.

Figure 4B:
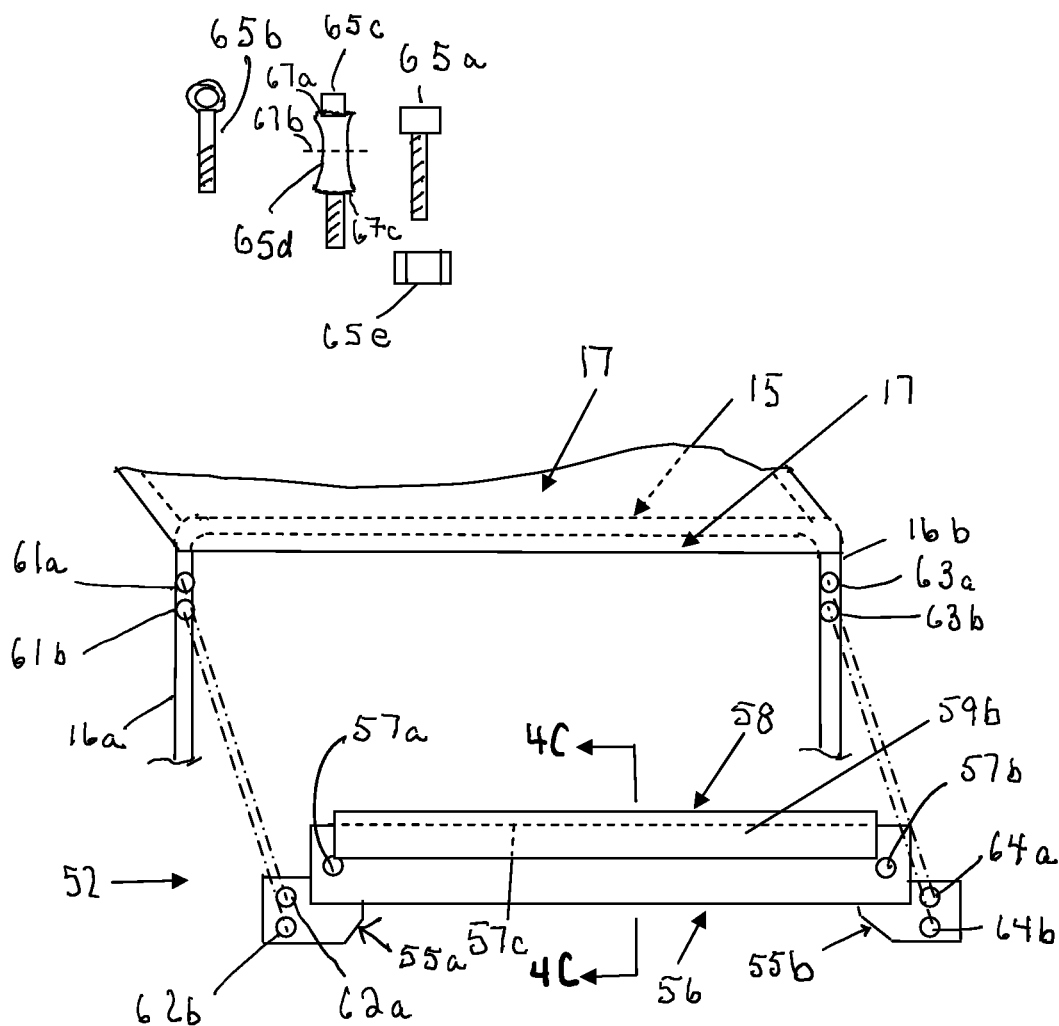
FIG. 4B is a view of a mount rail with a rain seal prepared to mount to a roll cage
Figure 4C:
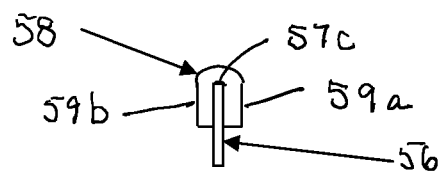
FIG. 4C is a sectional view along line 4C-4C in FIG. 4B

Looking again at FIG. 4B, a top left cab mounting hole 61a and a bottom left cab mounting hole 61b may be drilled though the left rear vertical cage bar 16a of the roll cage 15 when holes are not already present in the roll cage 15 as provided by the manufacturer, and a top right cab mounting hole 63a and bottom right cab mounting hole 63b may be drilled though the right rear vertical cage bar 16b of the roll cage 15. A first cab mount bracket 55a, may be mounted when a first bracket first hole 62a and a first bracket second hole 62b are aligned with the top left cab mounting hole 61a and the bottom left cab mounting hole 61b, respectively, and a rail fastener, such as a top bolt 65a, may be placed in the top left cab mounting hole 61a hole and the first bracket first hole 62a. A bolt, such as the an eyebolt 65b, is then placed in the bottom left cab mounting hole 61b and the first bracket second hole 62b. Similarly, a second right cab mount bracket, such as the second cab mount bracket 55b, may be mounted when the second bracket first hole 64a and the second bracket second hole 64b are aligned with the top right cab mounting hole 63a and the bottom right cab mounting hole 63b, respectively, and a bolt, such as the top bolt 65a, is placed in the top right cab mounting hole 63a and the second bracket first hole 64a, and a second bolt, such as the eyebolt 65b, is placed in the bottom right cab mounting hole 63b hole and the second bracket second hole 64b.

Figure 4D:
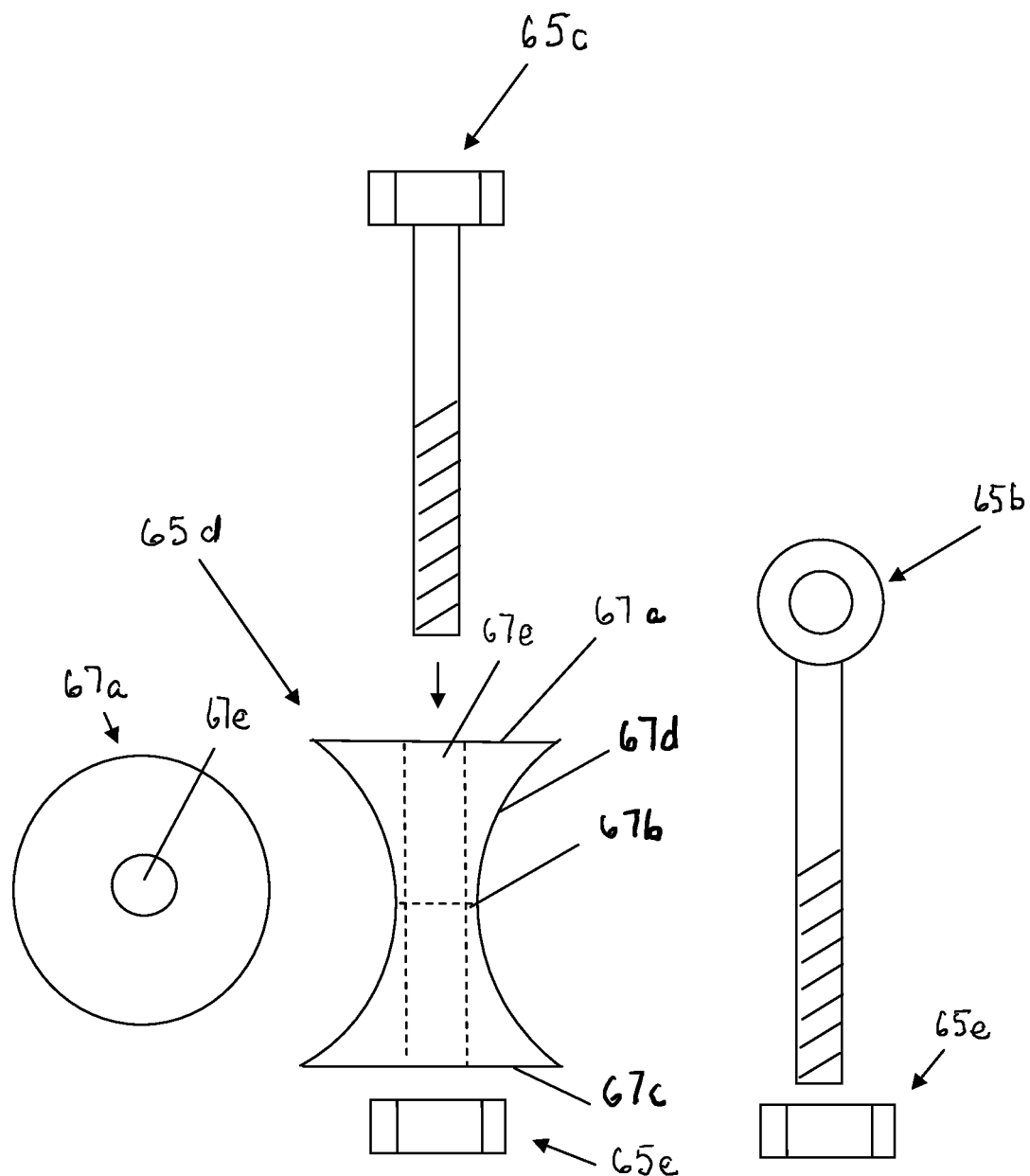
FIG. 4D is an elevation view of blots and fasteners for the mount rail

Looking again at FIGS. 4A, and 4B, the mount rail 56 is secured to the first cab mount bracket 55a and the second cab mount bracket 55b by aligning the left rail hole 57a and the right rail hole 57b with the first bracket rail hole 62c and the second bracket rail hole 64c, respectively, and attaching the mount rail 56 with a rail fastener, such a rail bolt 65c. The rail bolt 65c may first be inserted through a roller mount 65d as shown in FIG. 4D. The roller mount 65d is designed to support the top front portion 32 of the canopy frame 22 shown in FIG. 3A. Looking again to FIG. 4D, the rail bolt 65c may be secured with a nut 65e. The roller mount 65d may be a an hourglass shaped element designed to cradle the top front portion 32 of the canopy frame 22, and the roller mount 65d may have a first circular plane 67a that is parallel to a mid circular plane 67b and a second circular plane 67c. The mid circular plane 67b may be generally ⅓ the diameter of the first circular plane 67a and located midway between the first 67a and the second 67c circular planes. The roller mount 65d has a roller aperture 67e centered on the first 67a, mid 67b and second 67b circular planes and the roller aperture 67e is sized for a rail fastener, such as the rail bolt 65c, that is used to secure the roller mount 65d to the mount rail 56. The hourglass surface 67d tapers from the first circular plane 67a to the mid circular plane 67b, and then tapers back to the second circular plane 67c. The first circular plane is generally between 2.54 cm or 5.08 cm (i.e., 1 to 2 inches) in diameter.

Looking again at FIGS. 4A and 4B, the mount rail 56 is generally a rectangular cuboid that is 2.54-15.24 cm wide, preferably 7.62 cm, 3.2 to 38.2 mm thick, preferably 9.5 mm thick, and has a length sufficient to allow one end of the mount rail 56 to attach to the first cab mount bracket 55a and the other end of the mount rail 56 to attach to the second cab mount bracket 55b when the first cab mount bracket 55a and the second cab mount bracket 55b are mounted to the roll cage 15. The rain seal 58 may be a rubberized rectanguloid of 1.25 to 5.08 cm, wrapped around the mount rail 56 providing a seal when the bed top 20 is mounted on the vehicle bed 18. The rain seal 58 may be secured to the mount rail 56 by an adhesive, such as glue (not shown). The roller mount 65d may be made of steel, aluminum, rubber, or a plastic, preferably rubber.

Figure 4E:
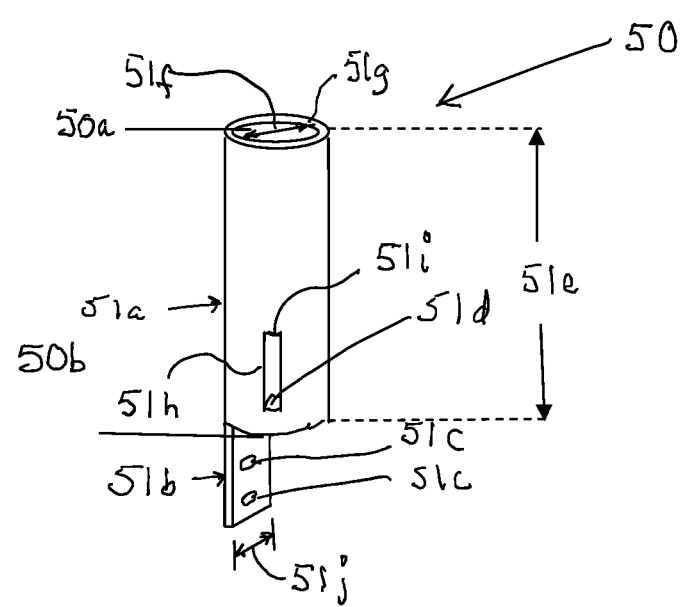
FIG. 4E is a prospective view of a leg mount
Figure 4F:
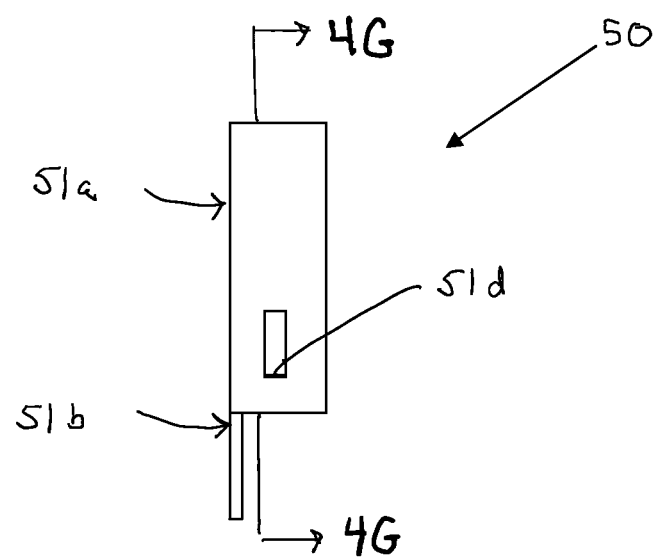
FIG. 4F is an elevation view of the leg mount
Figure 4G:
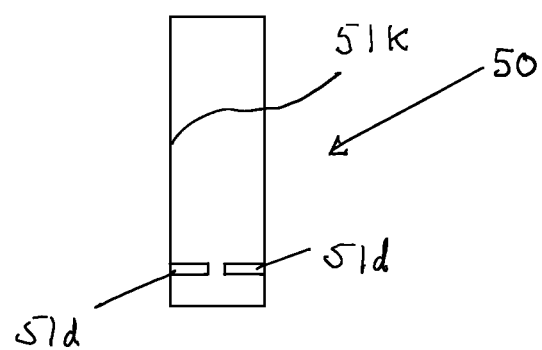
FIG. 4G is sectional view along line 4G-4G of the leg mount in FIG. 4F
Figure 5:
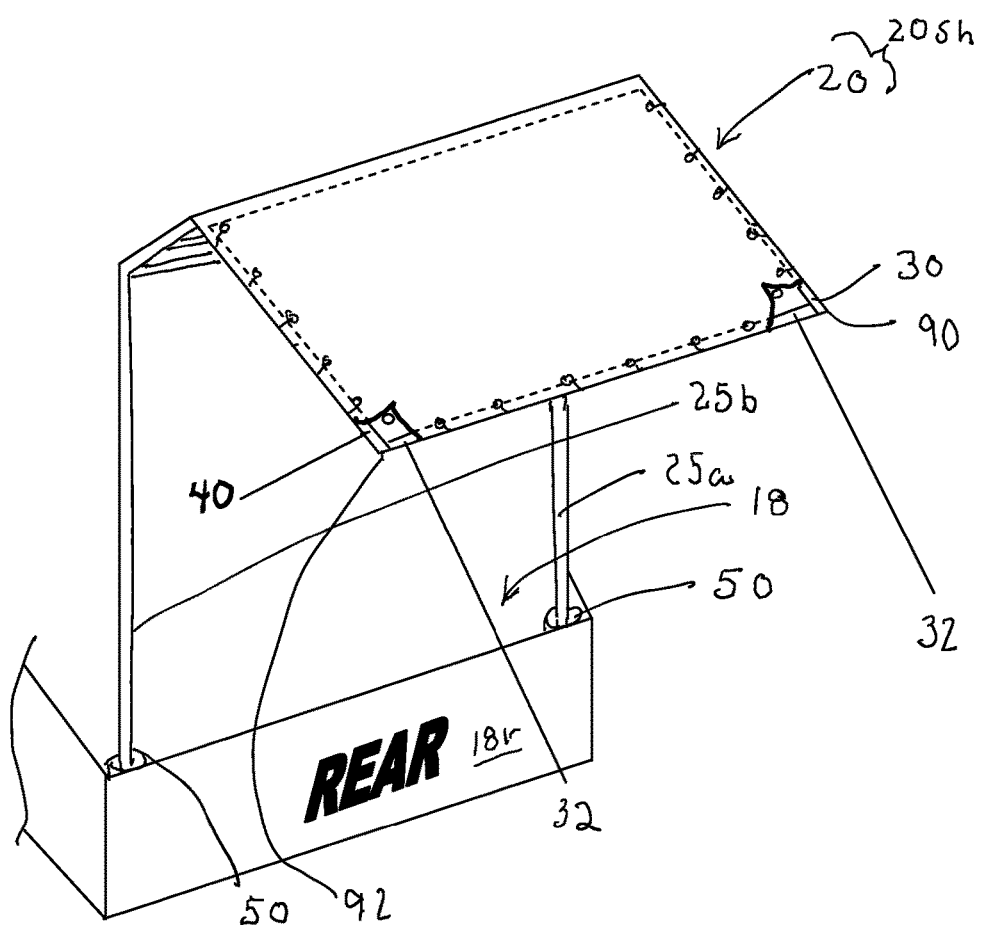
FIG. 5 is a prospective view of the bed top rotated 180 degrees forming a shade

Looking again at FIG. 3A, the left side top portion 30 and the top front portion 32 intersect to form the left front corner 90, and the right side top portion 40 and the top front portion 32 intersect to form the right front corner 92. Looking at FIG. 4E the leg mount 50 may comprise a cylindrical portion 51a that is hollow and has an open insert end 50a and an open strap end 50b, and further comprising a rectanguloid strap portion 51b extending from the strap end 50b of the cylindrical portion 51a. Two mount holes 51c may be drilled in the strap portion 51b and the vehicle bed 18 of FIG. 1 and a mount fastening means (not shown), such as any one of a screw, a nut and bolt, or a rivet used to secure the leg mount 50 to the vehicle bed 18. Where mounting holes are already are provided by the manufacture, for example, tie down holes drilled for a tie down mount (not shown), the mount holes 51c may be aligned with the tie down holes. At least one cantilever rectangular shaped cutouts, such as cutout 51d, is cut in the cylindrical portion 51a. Preferably, two cutouts 51d are cut in the cylindrical portion 51a. The cylindrical portion 51a may have a cylindrical length 51e between 10 and 25 cm, a cylindrical inner diameter 51f that is 2 mm larger than a leg outer diameter 26c of the left leg 26, and a cylindrical wall thickness 52g of 3 to 5 mm. The strap portion 51b will extend generally 2 to 12 cm below the cylindrical portion 51a and have a strap width 51j of ⅓ the cylindrical inner diameter 51f. The cutouts 51d may have a cutout width 51i that is ⅙ of the cylindrical inner diameter 51f and a cutout length 51h that is ⅓ the cylindrical inner diameter 51f. The cutout 51d is folded toward an interior 50a of the cylindrical portion 51a and is generally perpendicular to a cylindrical portion inner wall 51k as shown in FIGS. 4G, preventing the left rear telescopic support 25a inserted in the insert end 50a of FIG. 1 from passing through the cylindrical portion 51a and out of the strap end 50b. Looking at FIG. 5, a key feature of the present invention is that the bed top 20 can be rotated 180 degrees on the recreational vehicle 10 so that the left rear telescopic support 25a is now in the rear right mount 50 and the right rear telescopic support 25b is now in a rear left leg mount 50 with the bed top 20 serving as a shade 20sh off the rear 18r of the vehicle bed 18. Looking at FIG. 1, the leg mounts 50 may be mounted so that the cylindrical portion 51a is inside the vehicle bed 18 with the strap portion 51b adjacent to a bed inner wall 18c, or although not shown, the cylindrical portion 51a may rest on a bedrail 18a with the strap portion 51b again adjacent to the bed inner wall 18c.

Figure 6A:
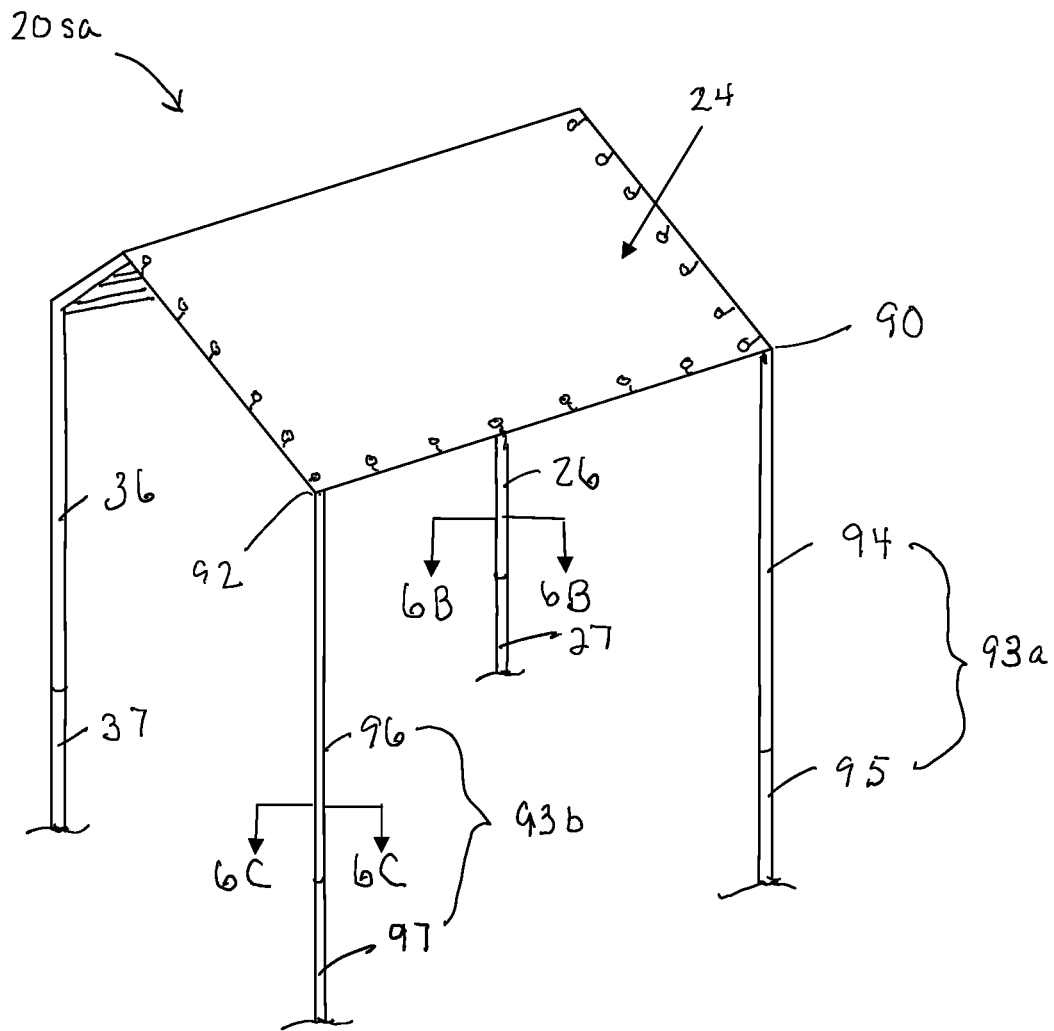
FIG. 6A is a prospective view of the bed top in FIG. 5 removed from the vehicle in a stand-alone configuration
Figure 6B:
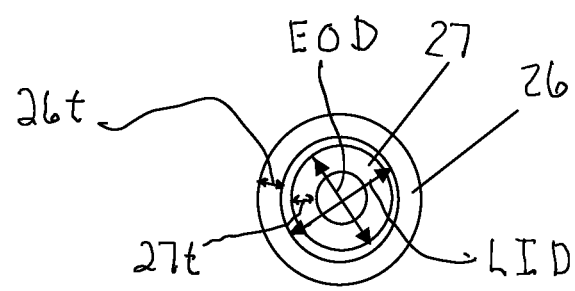
FIG. 6B is a sectional view along line 6B-6B of FIG. 6A
Figure 6C:
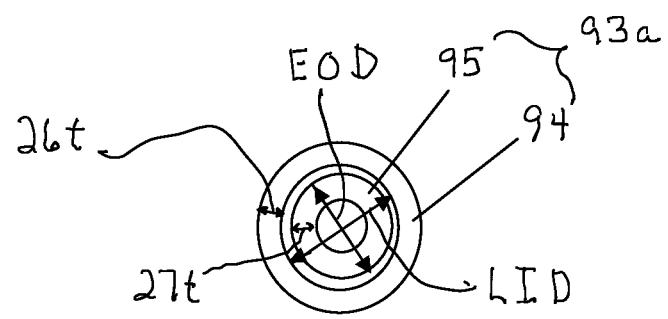
FIG. 6C is a sectional view along line 6C-6C of FIG. 6A
Figure 7:
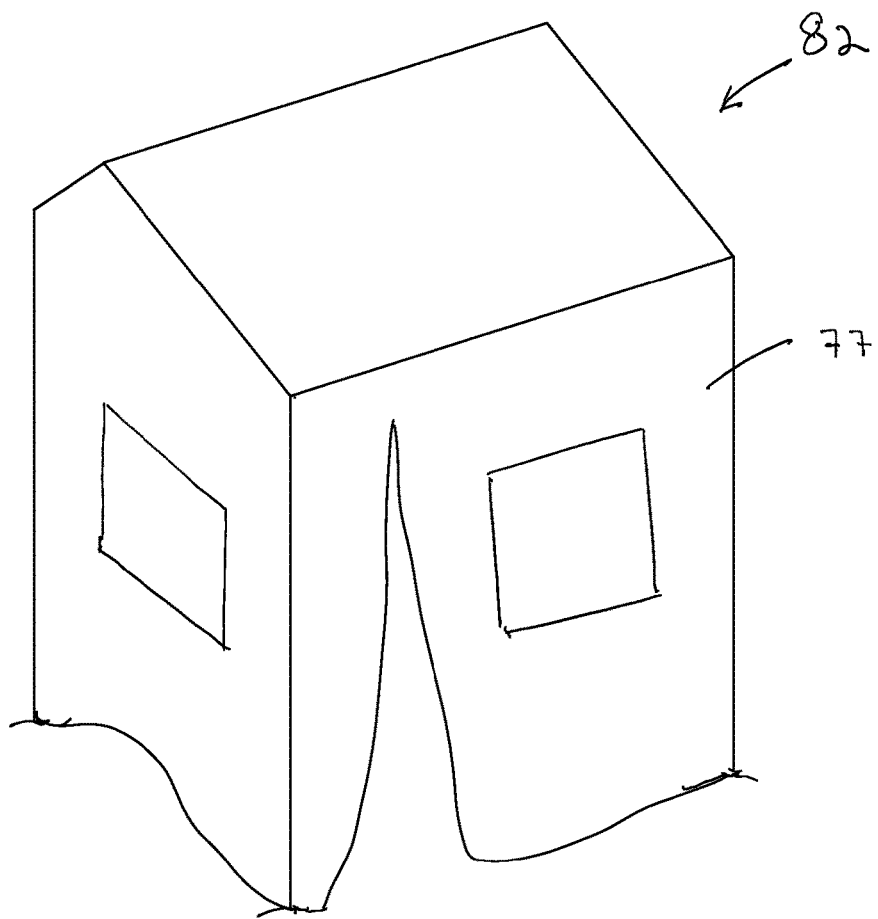
FIG. 7 is a prospective view of the bed top in FIG. 6A with a cover

Looking at FIG. 6A, the canopy frame 22 and canopy 24 may be removed from the vehicle bed 18 and used in a stand-alone configuration 20sa. The left leg extension 27 and the right leg extension 37 are each extended to the desired height, and a left front telescopic support 93a having a left front leg 94 and a left front leg extension 95 placed under the left front corner 90, and a right front telescopic support 93b having a right front leg 96 and a right front leg extension 97 placed under the right front corner 92. The left rear telescopic support 25a and the right rear telescopic support 25b are duplicates of each other, and the left front telescopic support 93a and the right front telescopic support 93b are duplicates of each other. The left front leg 94 and the left front leg extension 95 may have cross sections equivalent to the cross sections for the left leg 26 and the left leg extension 27, respectively, as shown in FIGS. 6B and 6C. The leg inner diameter LID is somewhat greater than the extension outer diameter EOD, preferably 2-4 mm greater. The legs, such as the left leg 26 and the left front leg 94 are generally 50 to 80 cm long and the leg extensions, such as the left leg extension 27 and the left front leg extension 95 are 2 to 5 cm shorter that the left leg 26. The left leg 26 and the left front leg 94 each have a leg diameter between 25 and 40 mm and a leg wall thickness 26t of 2 to 4 mm. The left leg extension 27 and the left front leg extension 95, each have has an extension outer diameter EOD that is 2-4 mm less that the leg inner diameter LID of the left leg 26 and the left front leg 94, respectively. The left leg extension 27 and the left front leg extension 95 each may have an extension thickness 27t that is equal to the as the leg wall thickness 26t. Looking at FIG. 7, a cover, such as a tarp 77, may be placed over the stand-alone configuration 20sa of FIG. 6A forming an enclosure 82. The enclosure 82 may be especially useful where cover is desired during recreational activities. For example, the enclosure 82 may be used while watching a baseball game or a football game, and can also be used as a hunting blind.

Figure 8A:
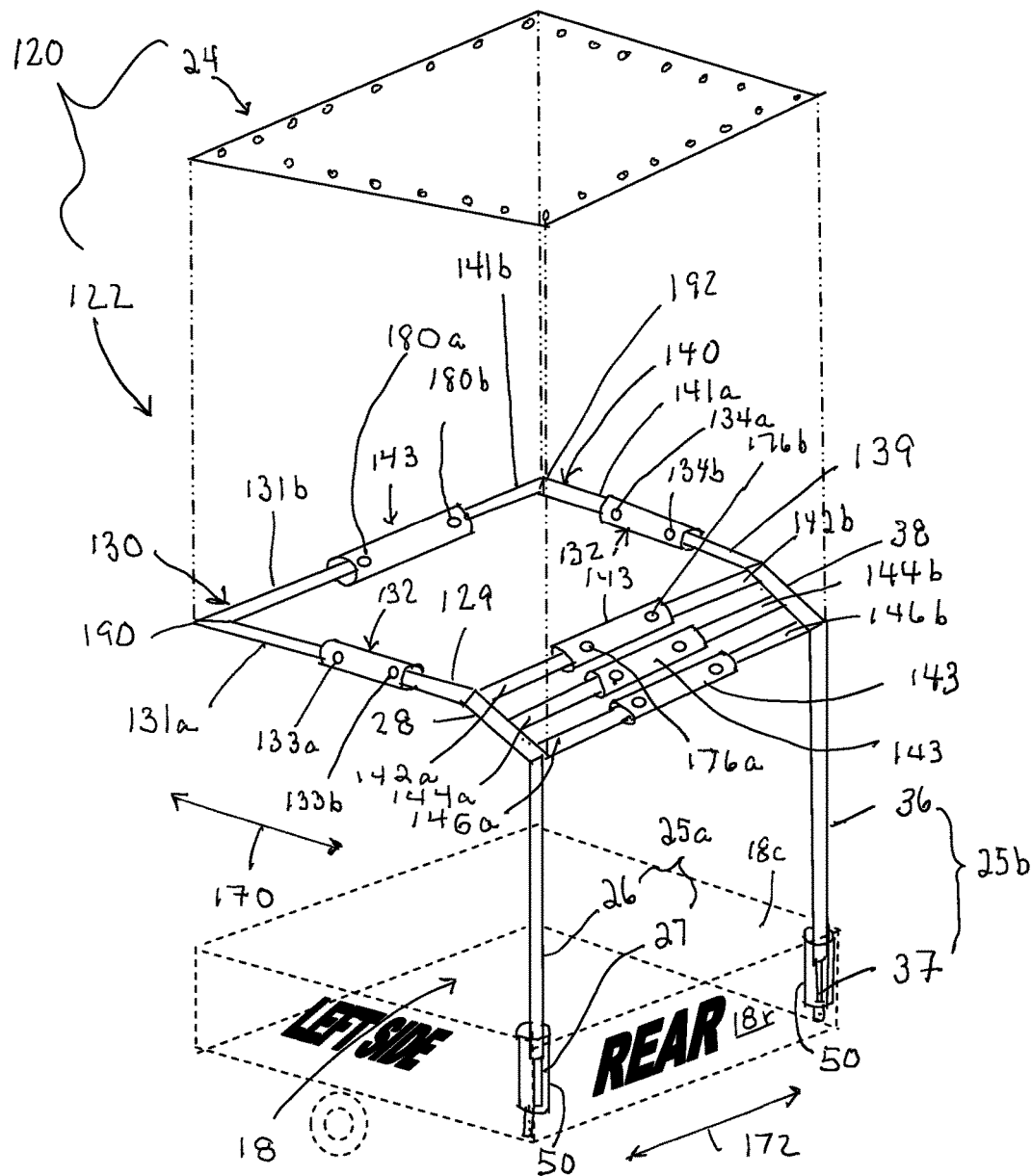
FIG. 8A is a prospective view of another embodiment of the present invention showing an adjustable bed top
Figure 8B:
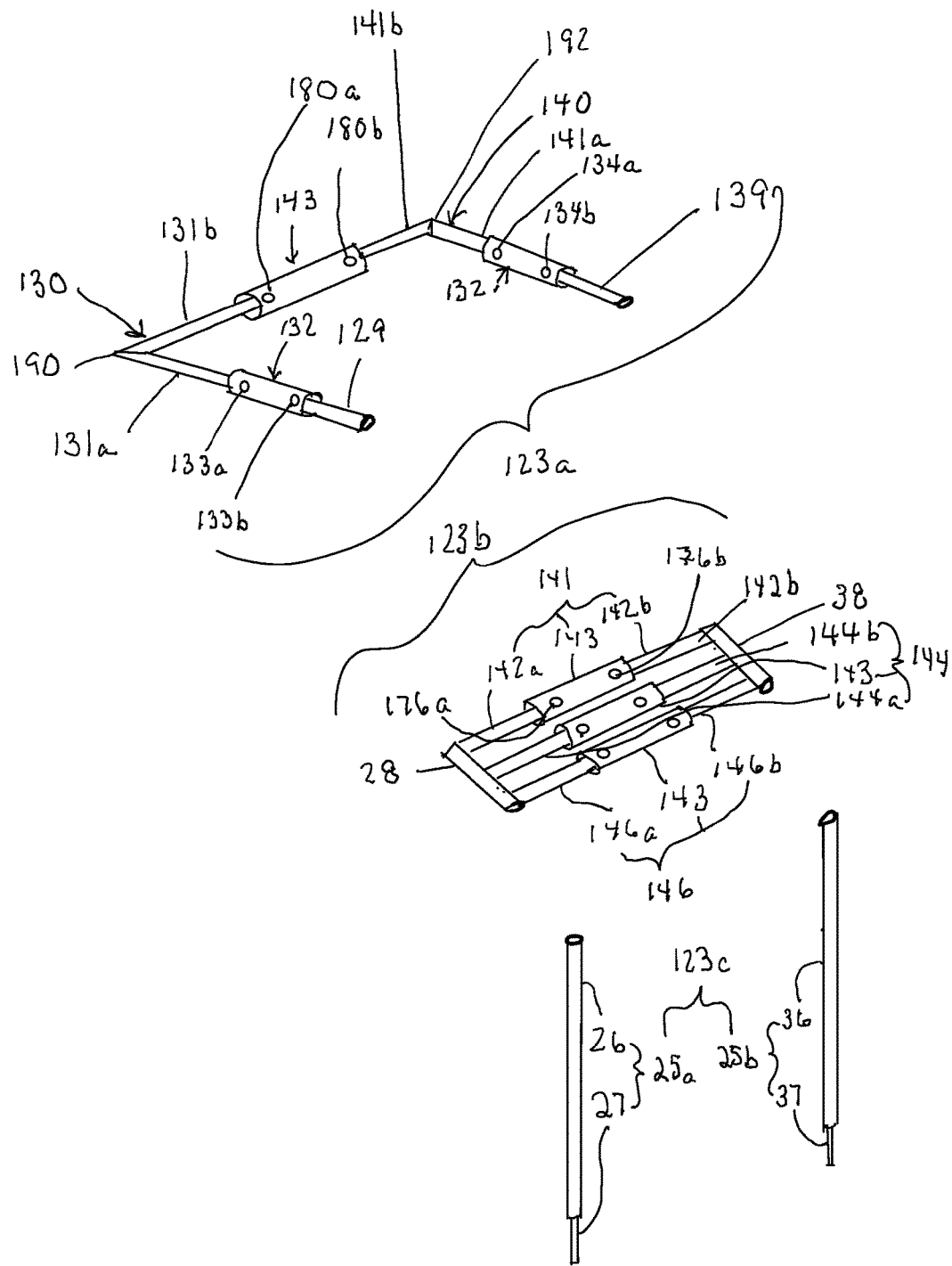
FIG. 8B is a prospective view an adjustable top portion, an adjustable arch portion, and the rear portion of an adjustable canopy frame
Figure 9A:
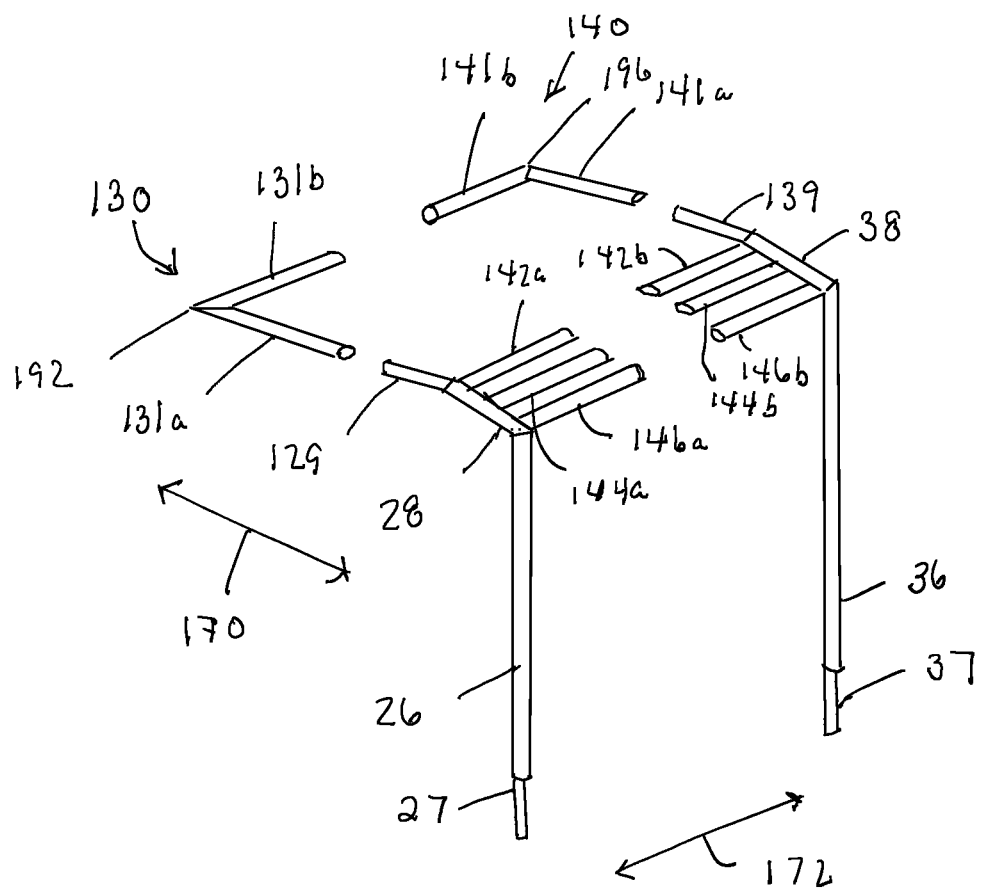
FIG. 9A is a prospective view of the adjustable canopy frame without any width slides or side slides

Another embodiment of the present invention, an adjustable bed top 120 is shown in FIGS. 8A, 8B and 8C. The adjustable bed top 120 is comprised of an adjustable canopy frame 122 and the canopy 24 shown in the FIG, 1, 2, and 3 of the previous embodiment of the invention, the bed top 20 and may also have the leg mounts 50 as an option. The adjustable canopy frame 122 is designed to adjust to varying recreational vehicle bed sizes in the marketplace using a width adjusting means, such as at least a width slide 143, and a length adjusting means, such as at least a side slide 132. FIG. 9A shows the adjustable canopy frame 122 without the width slides 143 and the side slides 132 of FIG. 8A. Looking to FIG. 9B, the width slide 143 has a width slide outer diameter WSOD, a width slide inner diameter WSID, a one end 143a and an other end 143b. The side slide 132 has a side slide inner diameter SSID, a side slide outer diameter SSOD, a side slide one end 132a and a side slide other end 132b. The width slide outer diameter WSOD and the width slide inner diameter WSID may be the same as the side slide inner diameter SSID and the side slide outer diameter SSOD, respectively. Looking at FIG. 8B, the adjustable canopy frame 122 comprises the same rear portion 23c of the previous embodiment of the invention, the bed top 20, shown in FIG. 3A. The adjustable canopy frame 122 further comprises an adjustable top portion 123a and an adjustable arch portion 123b. The adjustable arch portion 123b connects the adjustable top portion 123a to the rear portion 23c, and the adjustable top portion 123a is cantilevered from the adjustable arch portion 123b.

The adjustable canopy frame 122 is adjusted in a width direction 172 using a front adjusting means and an arch adjusting means. The front adjusting means and the arch adjusting means may be the width slide 143. The width slide 143 is also the width adjusting means.

The adjustable canopy frame 122 is adjusted in a length direction 170 using a right side adjusting means and a left side adjusting means that may be a left side slide 143 and a right side slide 143 that are duplicates of each other. The left side slide and a right side slide are shown as the side slide 132 that is also the length adjusting means.

Looking at FIGS. 8B, the adjustable top portion 123a comprises: an adjustable left corner portion 130, an adjustable right corner portion 140, the front adjusting means that may be a front width slide 143 (i.e., the width adjusting means), the left side adjusting means that is the side slide 132 (i.e., the length adjusting means), the right side adjusting means that is the side slide 132, and an adjustable left side top portion 129, and an adjustable right side top portion 139. Looking at FIG. 8B, the adjustable left corner portion 130 has a left corner side leg 131a having a left corner side leg first end 131a1 and a left corner side leg second end 131a2, and a left corner front leg 131b with a left corner front leg first end 131b1 and a left corner front leg second end 131b2. Looking at FIGS. 9A and 10A, the a left corner side leg first end 131a1 and the left corner front leg first end 131b1 form an adjustable left front corner 190. The adjustable right corner portion 140 comprises a right corner side leg 141a with a right corner side leg first end 141a1 and a right corner side leg second end 141a2, and a right corner front leg 141b with a right corner front leg first end 141b1 and a right corner front leg second end 141b2. The right corner front leg first end 141b1 and the right corner side leg first end 141a1 form an adjustable right front corner 192. Looking at FIG. 10A, the adjustable left side top portion 129 has an adjustable left side top portion first end 129a and an adjustable left side top portion second end 129b. The adjustable right side top portion 139 has an adjustable right side top portion first end 139a and an adjustable right side top portion second end 139b. The left corner front leg second end 131b2 slides into the front adjusting means, such as the one end 143a of the width side 143, and the right corner front leg second end 141b2 sides into a other end 143b of the width slide 143 allowing the adjustable top portion 123a to be adjusted in the width direction 172 as shown in FIG. 8A. To provide for adjustments in the length direction 170, the left side adjusting means, such as the side slide 132, and the right side adjusting means, such as the side slide 132, are used.

Looking again to FIGS. 8A, 8B, 10A and more particularly 10A, a first side member, such as the adjustable top front portion 129 and a second side member, such as the left corner side leg 131a, each have the side member outer diameter SMOD smaller than the width side inner diameter WSID of the side slide 132 allowing the left corner side leg second end 131a2 of the left corner side leg 131a to slide into the side slide one end 132a of the side slide 132 and the adjustable left side top portion second end 129b of the adjustable top front portion 129 to slide into the side slide other end 132b. In a similar manner, the right corner side leg second end 141a2 slides into the side slide one end 132a and the adjustable right side top portion first end 139a slides in to the side slide other end 132b.

Figure 9B:
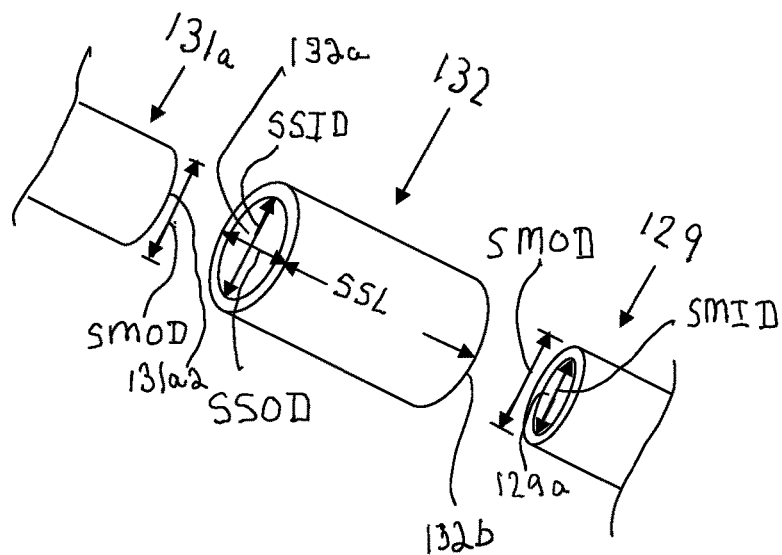
FIG. 9B is an exploded view of the side slide and the width slide FIG. 10A provides a top view of component parts of an adjustable top portion and an adjustable arch portion of the adjustable canopy frame
Figure 9B:
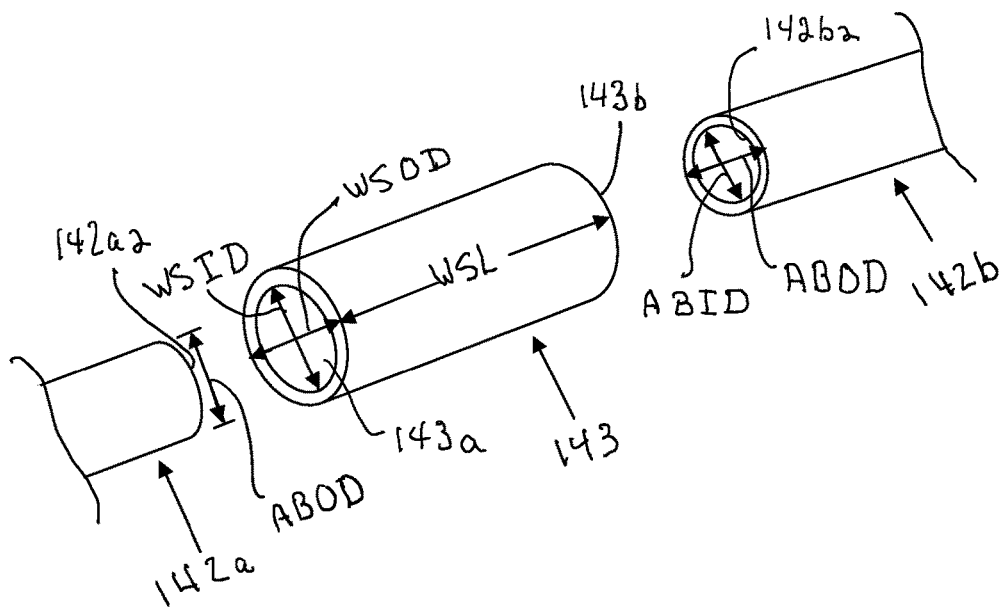
Figure 10A:
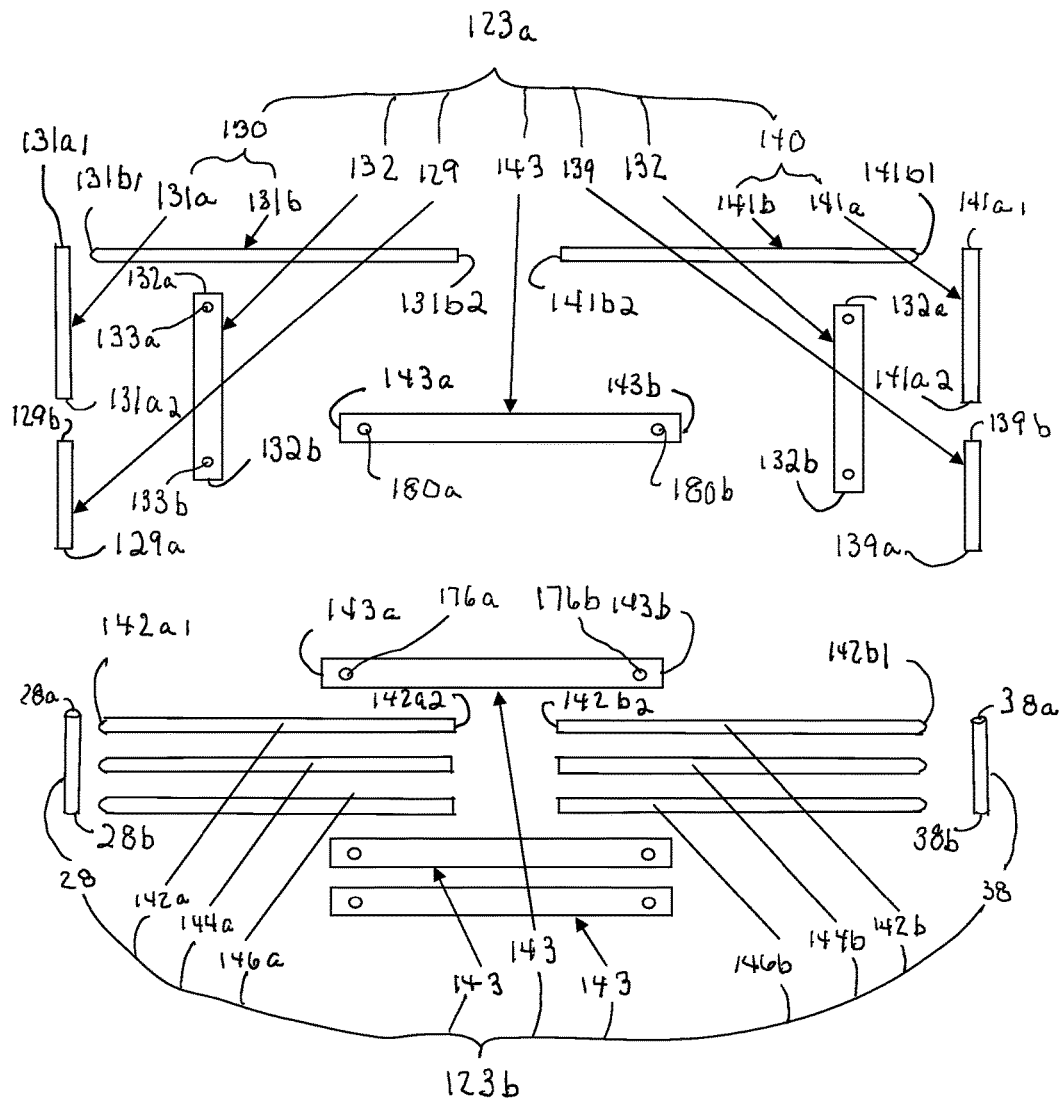
FIG. 10B shows another rear view of the component parts of the rear portion and the adjustable arch portion of the adjustable bed top
FIG. 10C shows a left side view of the adjustable canopy frame without a left side slide
FIG. 10D shows a top view of the adjustable canopy frame with the width slides and the side slides
FIG. 10E shows a rear view of the rear portion and the adjustable arch portion of the adjustable canopy frame
FIG. 10F shows a left side view of the rear portion and the adjustable arch portion of the adjustable canopy frame
FIG. 10G shows a top view of the adjustable canopy frame with the width slides and the side slides removed and the optional elbows, tees, and three way connectors
FIG. 10H shows a top view of the adjustable canopy frame assembled using fittings
FIG. 10I shows a rear view of the adjustable canopy frame assembled using fittings
FIG. 10J shows a left side view of the adjustable canopy frame assembled using fittings

Alternatively, referring to FIGS. 9B and 10A, when the second side member, such as the left corner side leg 131a and the first side member, such as the adjustable top front portion 129, each have the side member inner diameter SMID larger than the side slide outer diameter SSOD of the side slide 132, the side slide one end 132a of the side slide 132 may slide into the left corner side leg second end 131a2 of the left corner side leg 131a, and the side slide other end 132a of the side slide 132 may slide into the adjustable left side top portion second end 129b of the adjustable top front portion 129. In a similar manner, the side slide one end 132a may slide into the right corner side leg second end 141a2, and side slide other end 132b may slide into the adjustable right side top portion second end 139b of the adjustable right side top portion 139.

Referring to FIGS. 8A and 10A, once the adjustable canopy frame 122 is adjusted to the desired length, a left side first adjustment hole 133a is drilled through the left corner side leg 131a and the left side slide 132, and a left side second adjustment hole 133b is drilled through the adjustable left side top portion 129 and the left side slide 132. A right side first adjustment hole 134a is drilled through the right corner side leg 141a and the right side slide 132 and a right side second adjustment hole 134b is drilled through the adjustable right side top portion 139 and the right side slide 132. FIG. 10A provides a top view of parts of the adjustable canopy frame 122 showing the width slides 143, and the side slides 132.

Figure 10B:
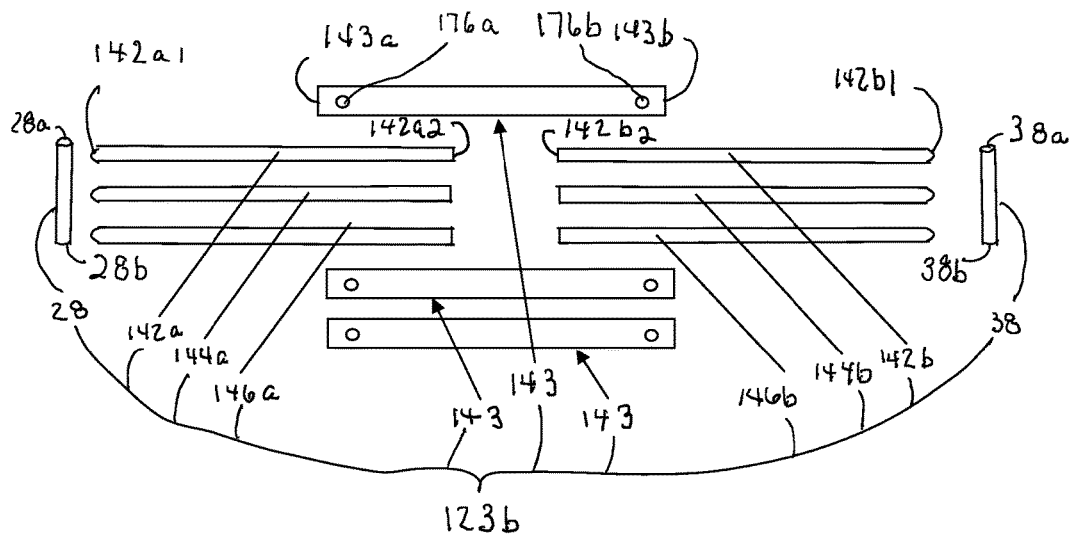
Figure 10B:
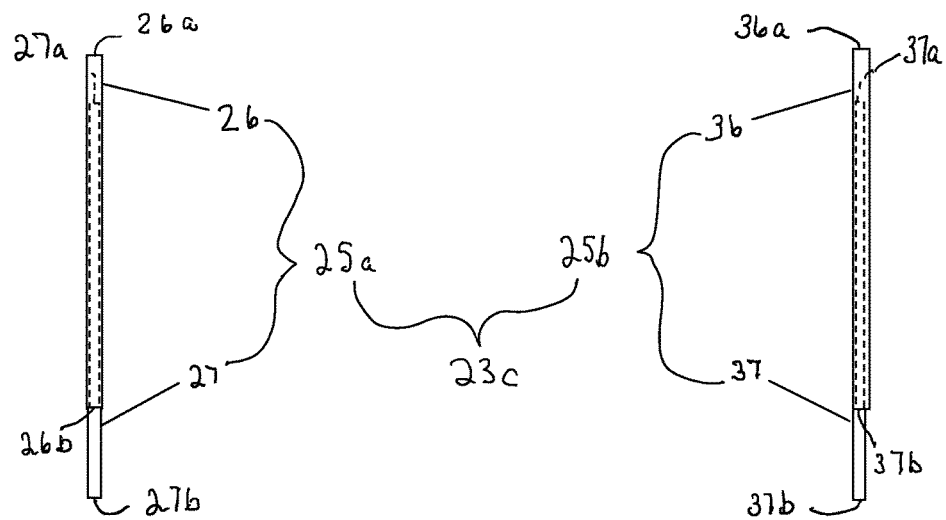
Figure 10C:
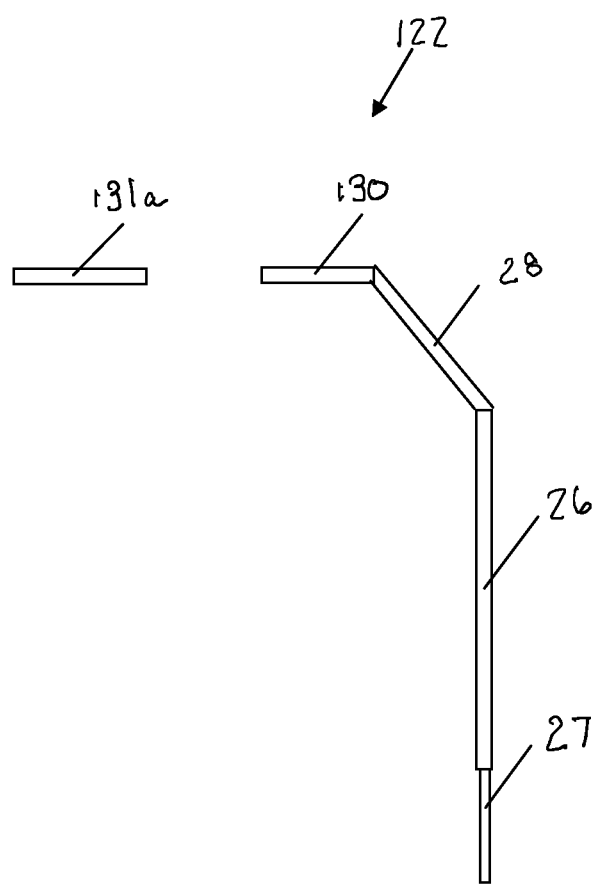
Figure 10D:
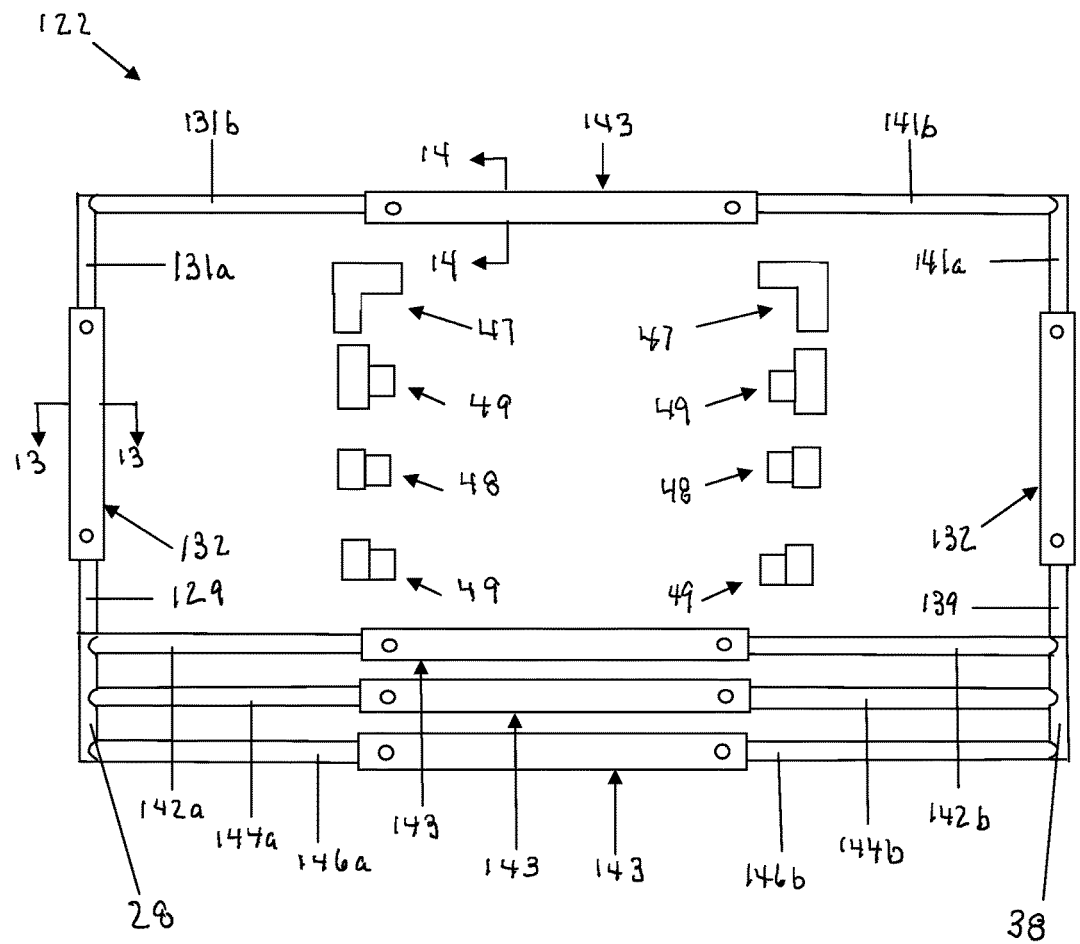
Figure 10E:
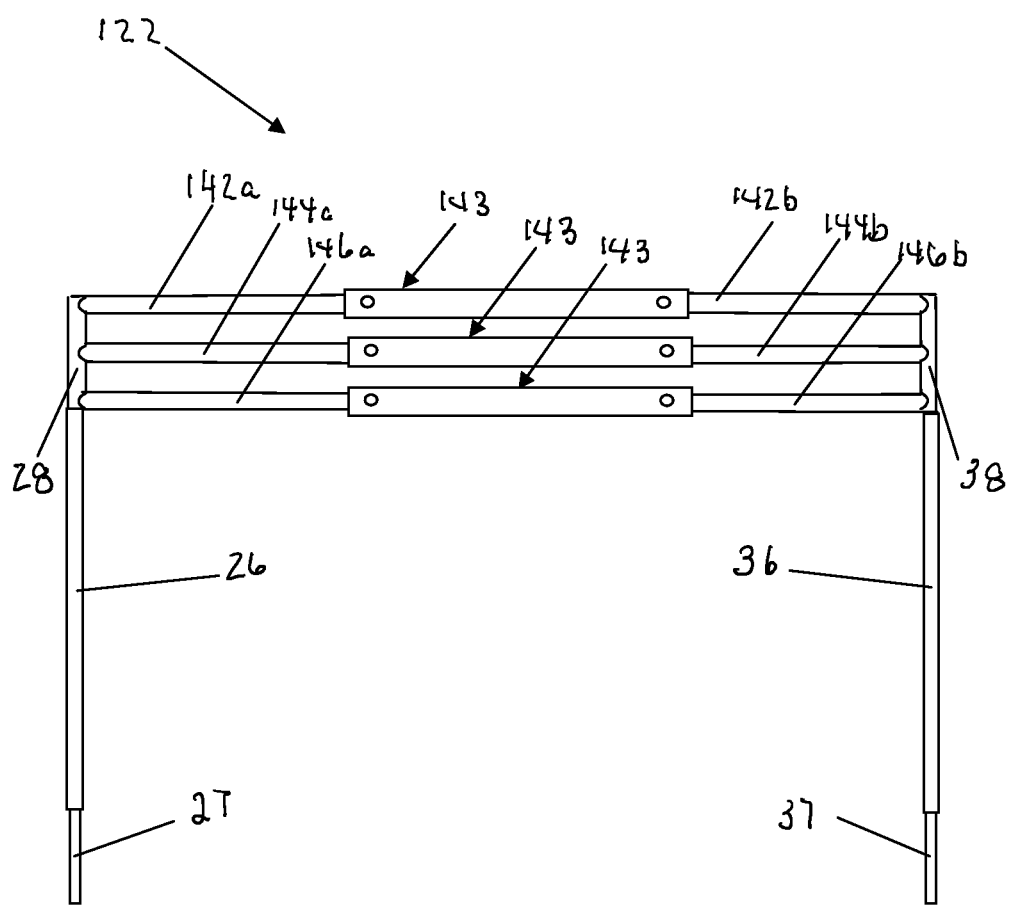
Figure 10F:
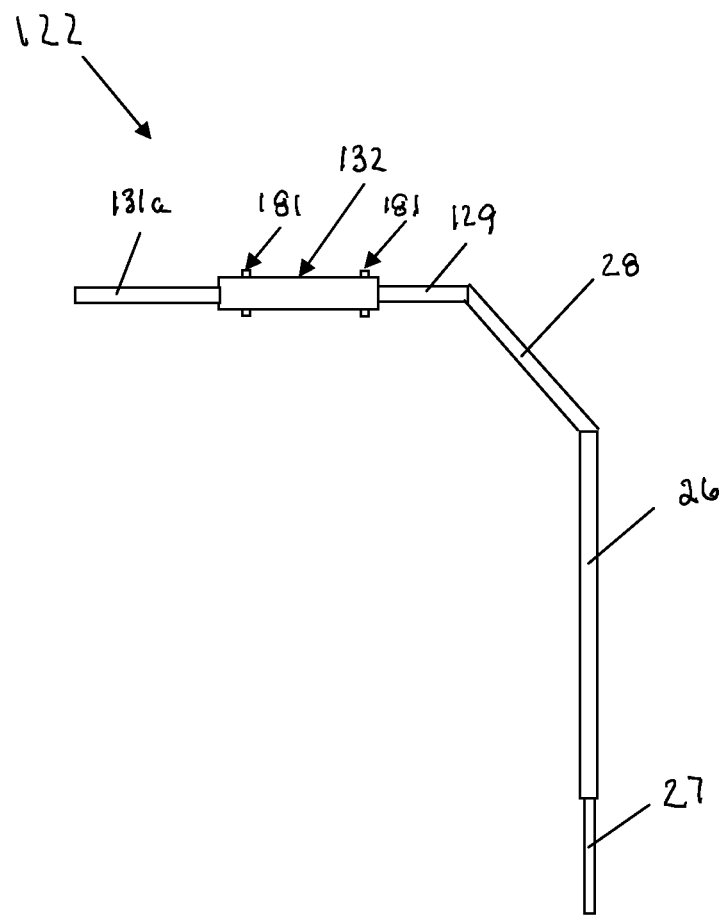
Figure 10G:
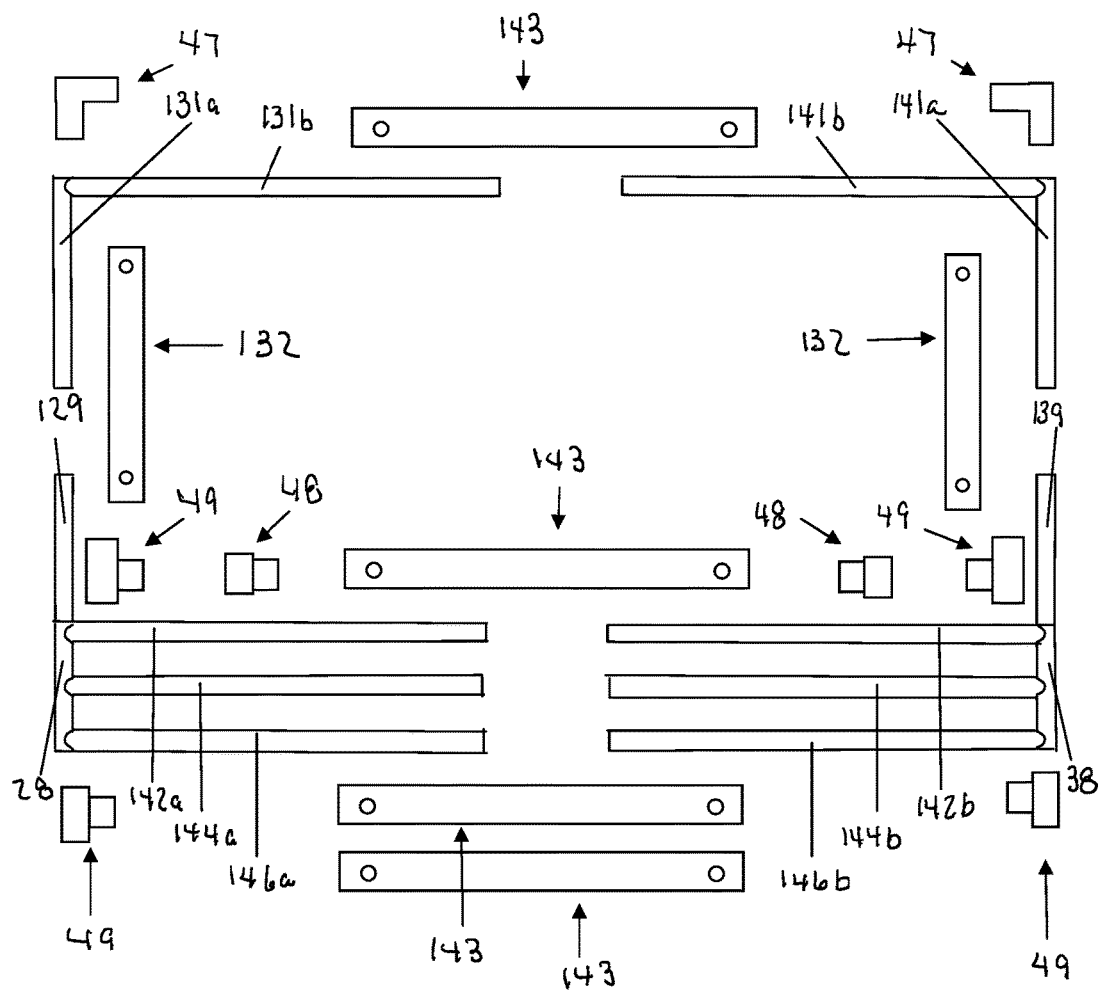
Figure 10H:
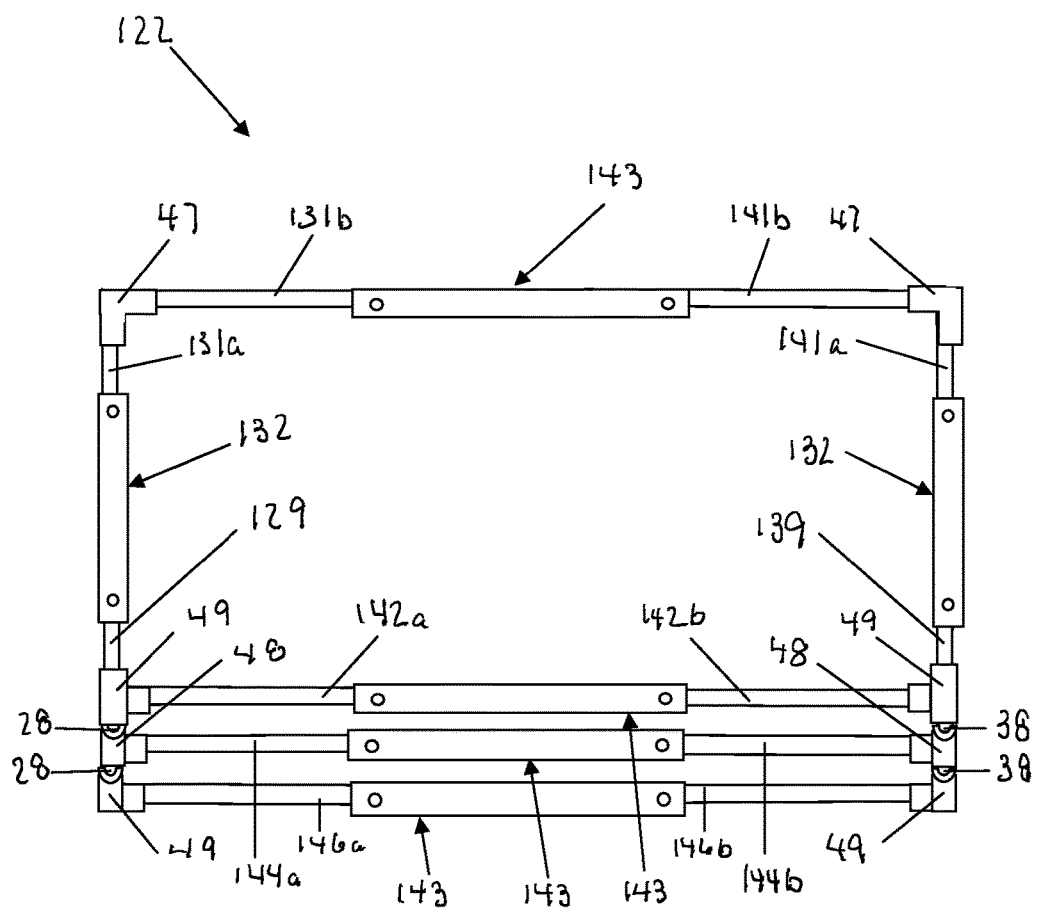
Figure 10I:
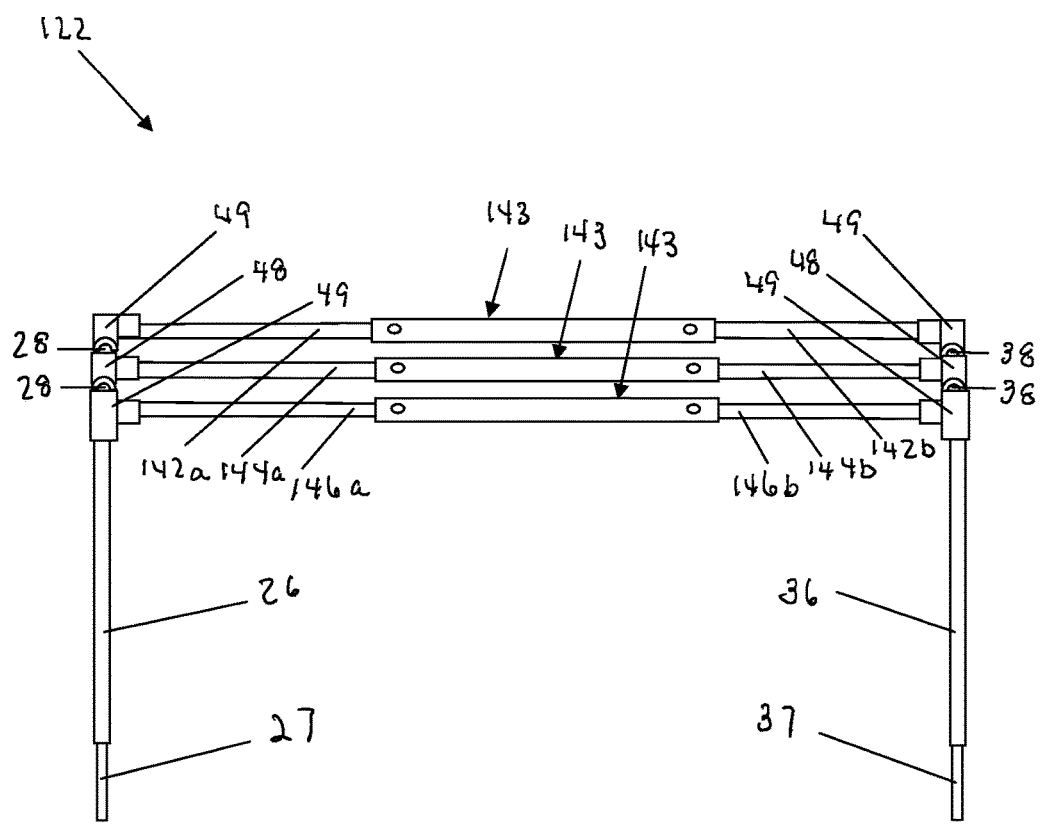
Figure 10J:
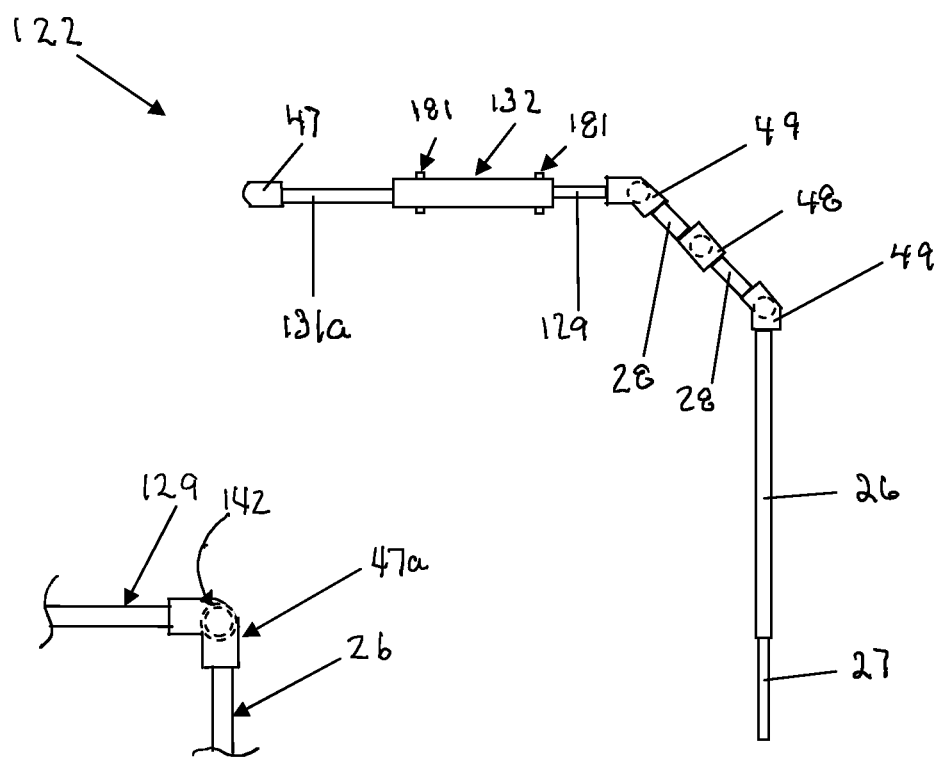
Figure 13:
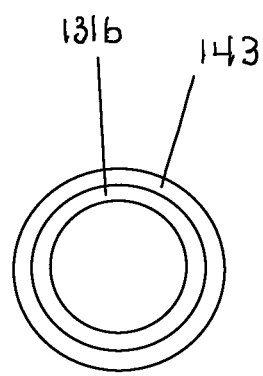
FIG. 13 is a sectional view along line 13-13 of FIG. 10D
Figure 14:
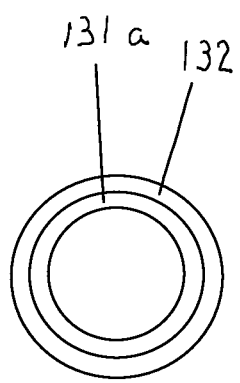
FIG. 14 is a sectional view along line 14-14 of FIG. 10D

Looking at FIG. 8B, the adjustable arch portion 123b comprises: the left side arch portion 28 and the right side arch portion 38 of the bed top 20 shown in FIG. 3A; at least an adjustable first arch bar 142 having a left first arch bar 142a and a right first arch bar 142b; and the width adjusting means, also know as the arch adjusting means, that may be the width slide 143. Looking at FIG. 10A, the left first arch bar 142a has a left first arch bar first end 142a1 and a left first arch bar second end 142a2. The right first arch bar 142b has a right first arch bar first end 142b1 and a right first arch second end 142b2. The left first arch bar first end 142a1 is attached generally perpendicular to the left side arch portion 28 and the left first arch bar second end 142a2 is inserted in the one end 143a of the width slide 143. The right first arch bar second end 142b2 is inserted in the other end 143b of the width slide 143 and the right first arch bar first end 142b1 is attached generally perpendicular to the right side arch portion 38. Optionally, the adjustable arch portion 123b may include a second adjustable arch bar 144 having a left second arch bar 144a, a right second arch bar 144b, a second width slide, such as the width slide 143; and a third adjustable arch bar 146 having a left third arch bar 146a, a right third arch bar 146b, and a third width slide, such as the width slide 143. FIG. 10A provides a top view of parts of the adjustable canopy frame 122 showing the width slides 143, and the side slides 132. FIG. 10B shows the adjustable top portion and the rear portion the adjustable canopy frame 122. FIG. 10C shows a left side view of the adjustable canopy frame 122 without the left side slide 132. FIG. 10D shows a top view of the adjustable canopy frame 122 with the width slide 143 and the side slides 132 and directs a viewer to a sectional view of the front width slide 143 with the left corner front leg 131b inserted shown in FIG. 13 and a sectional view of a left side slide 132 with a right corner side leg 131a inserted shown in FIG. 14. FIG. 10E shows a rear view of the adjustable canopy frame 122 with the width slide 143. FIG. 10F shows a left side view of the adjustable canopy frame 122 with the left side slide 132 and slide fasteners 181. FIG. 10G shows a top view of the adjustable canopy frame 122 with the width slide 143, the side slide 132, the elbows 47, the tees 48, the three-way connectors 49 disassembled from the adjustable canopy frame 122. FIG. 10H shows a top view of the adjustable canopy frame 122 with the width slides 143 and the side slides 132 assembled using the elbows 47, the tees 48, and the three-way connectors 49. FIG. 10I shows a rear view of the adjustable canopy frame 122 with the width slide 143 assembled using the tees 48 and the three-way connectors 49. FIG. 10J shows a side view of the adjustable canopy frame 122 with the left side slide 132, and the elbow 47, the tees 48, the three-way connectors 49. The side arch portions, such as the left side arch portion 28 may be a 90 degree three-way fitting 47a connected to: the leg, such as the left leg 26; the adjustable side top front portion, such as the adjustable left side top portion 129; and the adjustable first arch bar 142. Although not shown, the adjustable first arch bar 142 may also be mounted as part of the adjustable top portion 123a or the rear portion 23c.

Looking at FIG. 9B, an exploded view of the width slide 143, the width slide 143 may have the width slide inner diameter WSID somewhat larger than an outer diameter of a first width member, such as the arch bar outer diameter ABOD of the right first arch bar 142b, and also larger than an outer diameter a second width member, such as the arch bar outer diameter ABOD of the left first arch bar 142a, allowing the distal end of the second width member, such as the left first arch bar second end 142a2 to slide in the one end 143a of the width slide 143 and the distal end of the first width member, such as the right first arch bar second end 142b2 to slide into the other end 143b of the width slide 143. Referring to FIGS. 8A and 10A, and continuing to look at the adjustable arch portion 123b when the second adjustable arch bar 144 and the third adjustable arch bar 146 are present, the left second arch bar 144a slides into the one end 143a of the second width slide 143 and the right second arch bar 144b slides into the other end 143b of the second width slide 143, and the left third arch bar 146a slides into the one end 143a of the third width slide 143 and the right third arch bar 146b slides into the other end 143b of the third width slide 143.

Referring to 8A and 10A, once the desired width of the adjustable arch portion 123b is achieved, a left arch width adjustment hole 176a is drilled through each of the first width slide 143, the second width slide 143, and the third width slide 143, and the inserted left first ach bar 142a, left second arch bar 144a, and left third arch bar 146a, respectively. A right arch width adjustment hole 176b is drilled through each of the first width slide 143, the second width slide 143, and the third width slide 143, and the inserted right first ach bar 142b, right second arch bar 144b, and right third arch bar 146b, respectively. The left arch width adjustment hole 176a may be generally located 2.54 cm from the one end 143a of each arch bar slide, such as first width slide 143, that is closest to the left side arch portion 28; and the right arch width adjustment hole 176b may be generally located 2.54 cm from the other end 143b of each arch bar slide, such as first width slide 143, that is closest to the right side arch portion 38.

Referring to FIGS. 8A and 10A, to adjust the adjustable top portion in the width direction 172, the corner front leg second end 131b2 slides into the one end 143a of the front width slide 143 and the right corner front leg second end 141b2 slides onto the other end 143b of the front width slide 143.

Referring to FIG. 8A and 10A, once a desired width of the adjustable top portion of the adjustable canopy frame 122 is obtained, a left front adjustment hole 180a may be drilled through the left corner front leg 131b and the front width slide 143, and a right front adjustment hole 180b may be drilled through the right corner front leg 141b and the front width slide 143. The left front adjustment hole 180a and right front adjustment hole 180b may be located 2.54 cm from the one end 143a of width slide 143 and 2.54 cm from the other end 143b of the width slide, respectively.

Referring to FIG. 9B, in an alternative version of adjustments in the width direction 172, the width adjusting means, the arch bar inner diameter ABID of the second width member, the left first arch bar 142a of the adjustable first arch bar 142, and the arch bar inner diameter ABID of the of the first width member, the right first arch bar142b of the adjustable first arch bar 142, may be somewhat larger that an width slide outer diameter WSOD of the of the width slide 143 allowing the one end 143a of the width slide 143 to side in the distal end of the second width member, such as the left first arch bar second end 142a2 of the left first arch bar 142a, and the other end 143b of the width slide 143 to slide into the distal end of the first width member, such as the right first arch bar second end 142b2 of the right first arch bar 142b. Similarly, the one end 143a of the front width slide 143 will be slide into the left corner front leg second end 131b2 and the other end 143b of the front width slide 143 will slide into the right corner front leg second end 141b2.

Once a desired length and width of the adjustable canopy frame 122 is obtained, a slide fastening means, such as the slide fastener 181 shown in FIG. 10F, is used hold the width slides 143 and the side slides 132 in position. For example, looking at FIGS. 8A and 10F, a slide fastening means, such as the slide fasteners 181, may be inserted in left side first adjustment hole 133a and left side second adjustment hole 133b. Similarly, the slide fastener 181 may be inserted in the left front adjustment hole 180a, the right front adjustment hole 180b, the right side first adjustment hole 134a, the right side second adjustment hole 134b, the left arch width adjustment hole 176a and the right arch width adjustment hole 176b. The slide fastener 181 may be a nut and bolt, a pin, or a tie, preferably a nut and bolt sized to the particular hole.

Looking to again FIG. 3A, parts may be cut to conform to a particular bed size, or looking at FIG. 8A, where versatility is desired, the width adjustments using width slides 143 and the length adjustments using side slides 132 may be used. Additionally, adjustment holes in the adjustable canopy frame 122, such as left side first adjustment hole 133a, and may be drilled on site after the correct configuration of the adjustable canopy frame 122 is obtained, or the adjustment holes for a variety of vehicle bed sizes may be predrilled by a manufacturer of the adjustable bed top 120.

Figure 11:
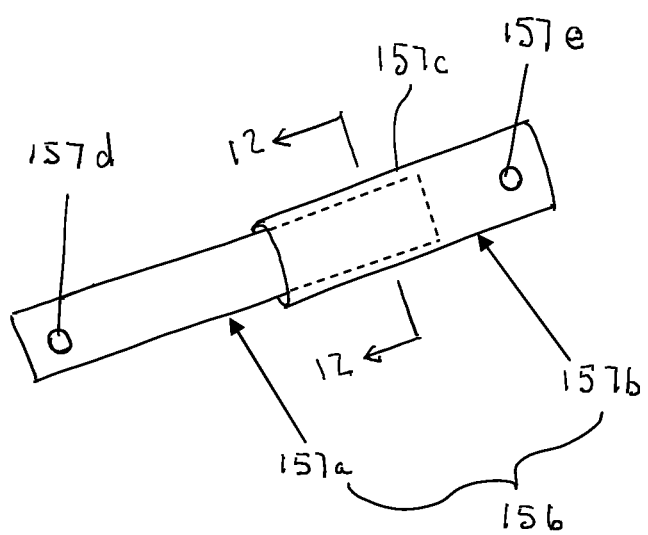
FIG. 11 is a prospective view of an adjustable mount rail
Figure 12:
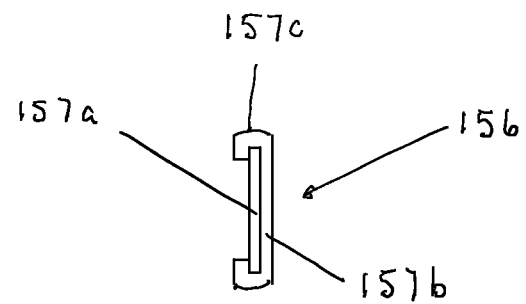
FIG. 12 is a sectional view along line 12-12 in FIG. 11

Looking at FIGS. 11 and 12, an adjustable mount rail 156 may be substituted for the mount rail 56 shown in FIGS. 4A and 4B. The adjustable mount rail 156 comprises a mount first slide portion 157a and a mount second slide portion 157b, an adjustable mount rail top edge 157c, a left adjustable mount rail hole 157d, and a right adjustable mount rail hole 157e. The adjustable mount rail 156 may be adjusted to the desired length by sliding the mount first slide portion 157a out of and back into the mount second slide portion 157b. Similar to the mount rail 56 shown in FIGS. 4A and 4B, the rain seal 58 in FIGS. 4A and 4B may be cut to the desired length and applied to the adjustable mount rail top edge 157c. The adjustable mount rail 156 in FIG. 11 may be secured to the first cab mount bracket 55a and the second cab mount bracket 55b in FIG. 4A in a manner similar to the mount rail 56 in FIG. 4B.

Figure 15:
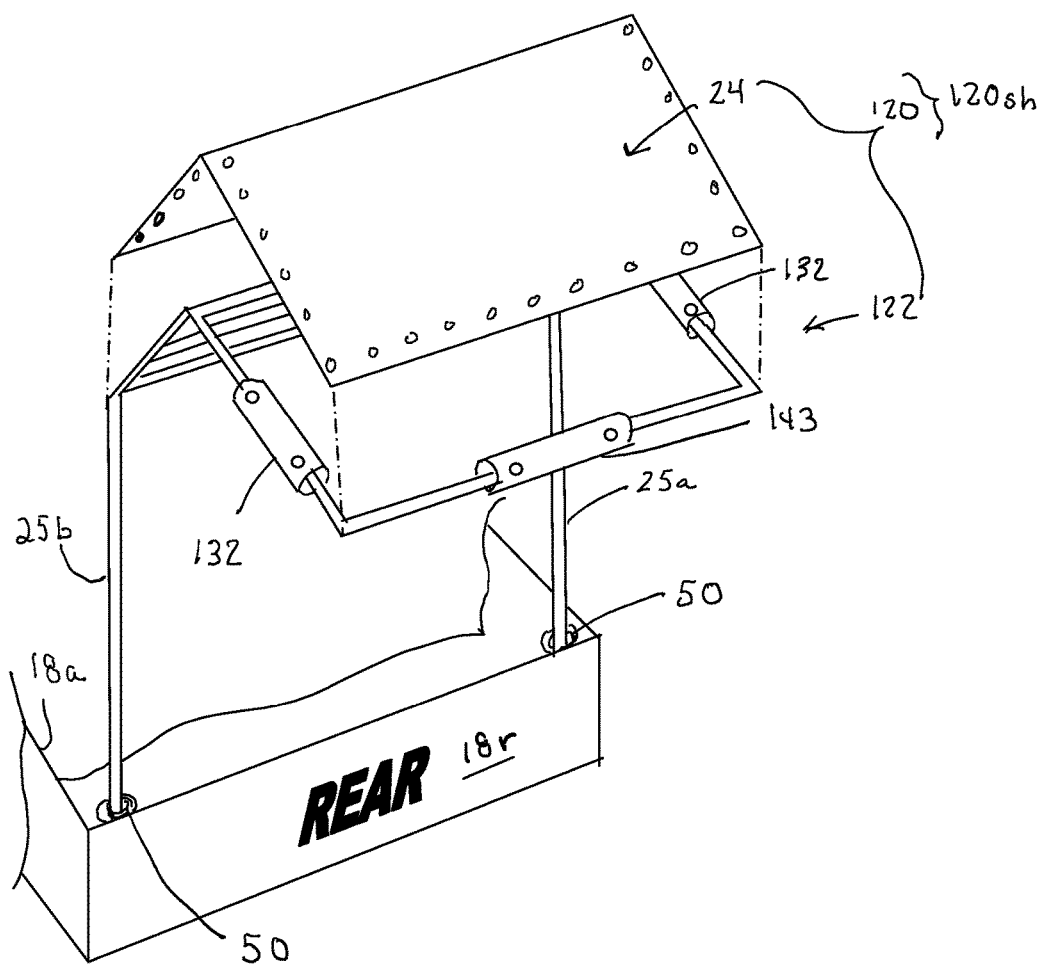
FIG. 15 is a prospective view of the adjustable canopy frame rotated 180 degrees without the canopy
Figure 16:
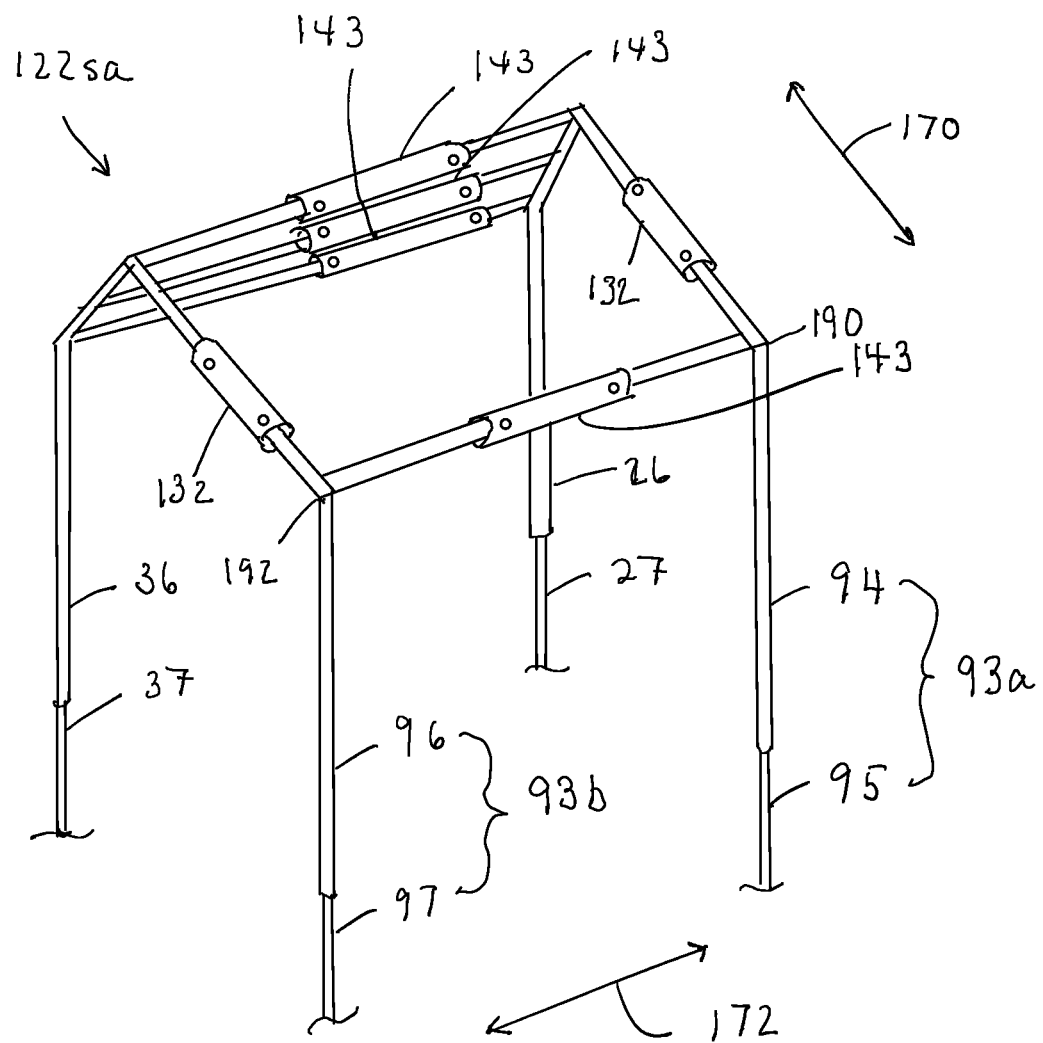
FIG. 16 is the adjustable canopy frame in a stand-alone configuration
Figure 17:
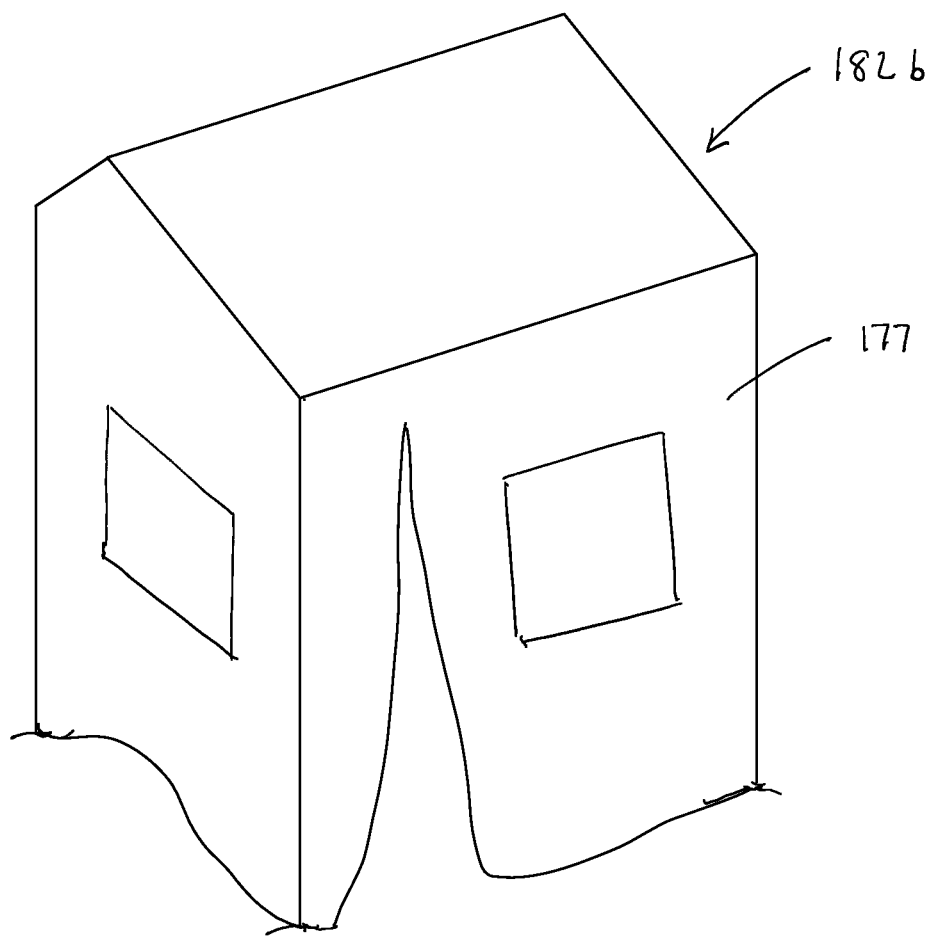
FIG. 17 is a prospective view of the adjustable canopy frame in FIG. 16 with a large cover forming and a large enclosure

Looking at FIG. 15, the adjustable canopy frame 122 of the adjustable bed top 120 can be rotated 180 degrees so that the left rear telescopic support 25a is in the rear right leg mount, such as the leg mount 50, and the right rear telescopic support 25b is located in the rear left leg mount, such as the leg mount 50, with the adjustable bed top 120 serving as an adjustable shade 120sh off the rear 18r of the vehicle bed 18. Alternatively, looking at FIG. 16, the adjustable canopy frame 122 can be removed from the vehicle bed 18 and placed on the ground in an adjustable stand-alone configuration 122sa. The adjustable canopy frame 122 has the left rear telescopic support 25a and the right rear telescopic support 25b as the previous embodiment of the invention, the bed top 20 shown in FIG. 5, and the left front telescopic support 93a and the right front telescopic support 93b shown in FIG. 6A. The left front telescopic support 93a and the right front telescopic support 93b may be extended and placed under a adjustable left front corner 190 and an adjustable right front corner 192, respectively, forming the adjustable stand-alone configuration 122sa. The length of the adjustable canopy frame 122 may be adjusted in the length direction 170 using the side slides 132. The width of the adjustable canopy frame 122 may be adjusted in the width direction 172 using the width slides 143 as previously discussed. Looking at FIG. 17, a cover, such as a large hunting blind cover 177, can be placed over the adjustable canopy frame 122 on the adjustable stand-alone configuration 120sa shown of FIG. 16 forming a large hunting enclosure, such as large enclosure 182b.

Figure 18A:
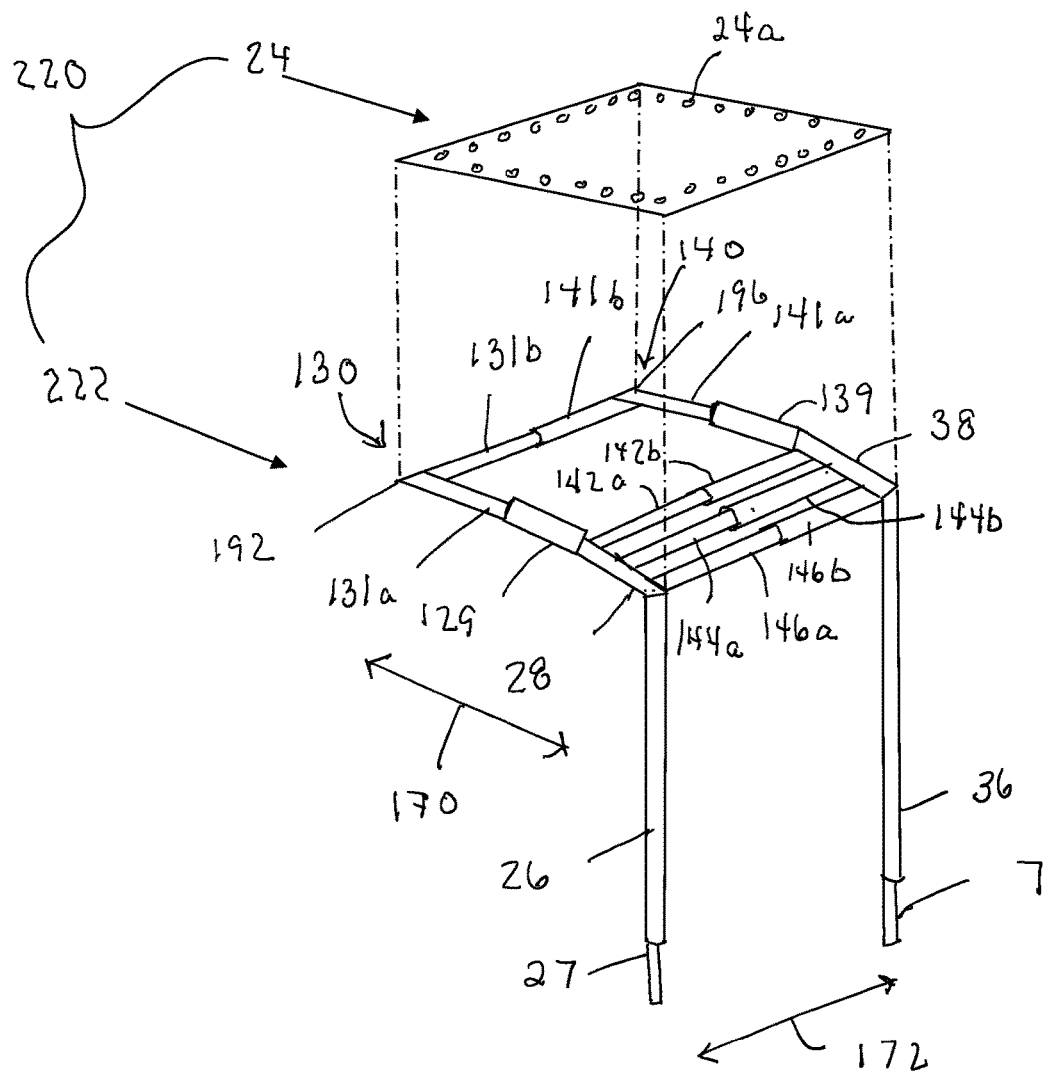
FIG. 18A is a prospective view of yet another embodiment of the present invention with a simple adjustable canopy frame
Figure 18B:
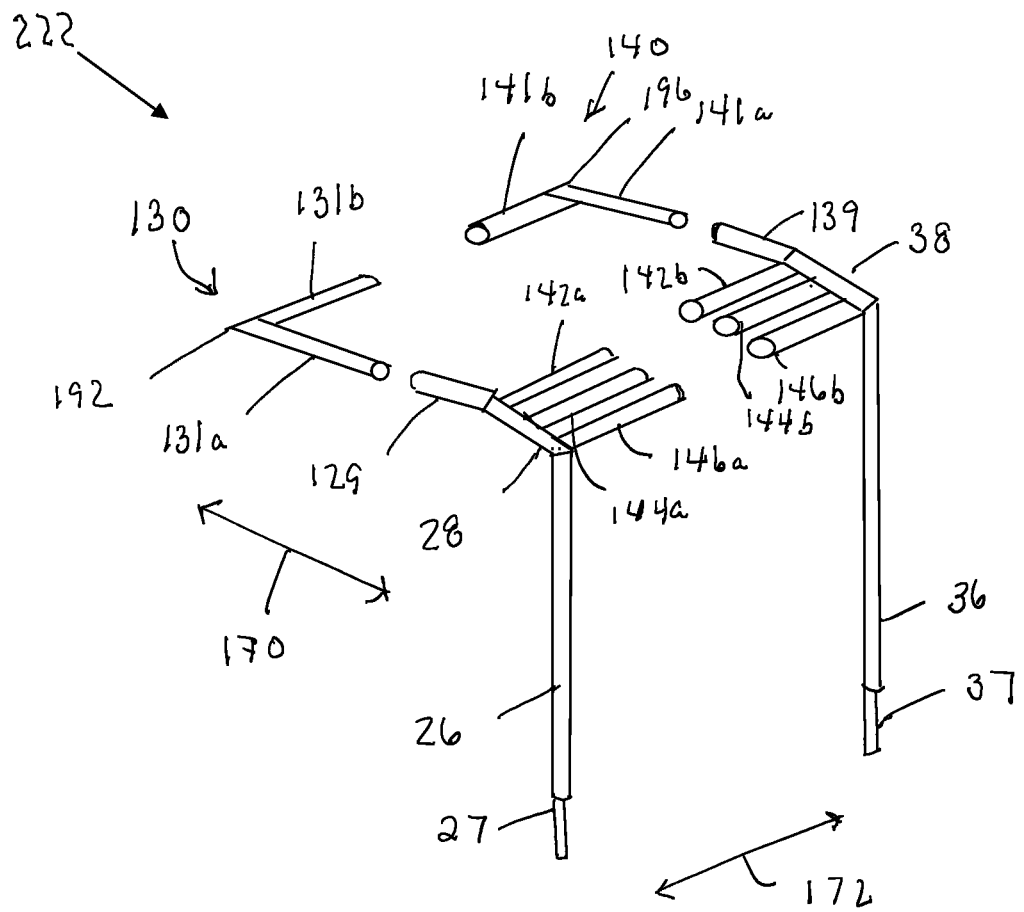
FIG. 18B is another prospective view of the yet another embodiment of the simple adjustable canopy frame separated
Figure 19:
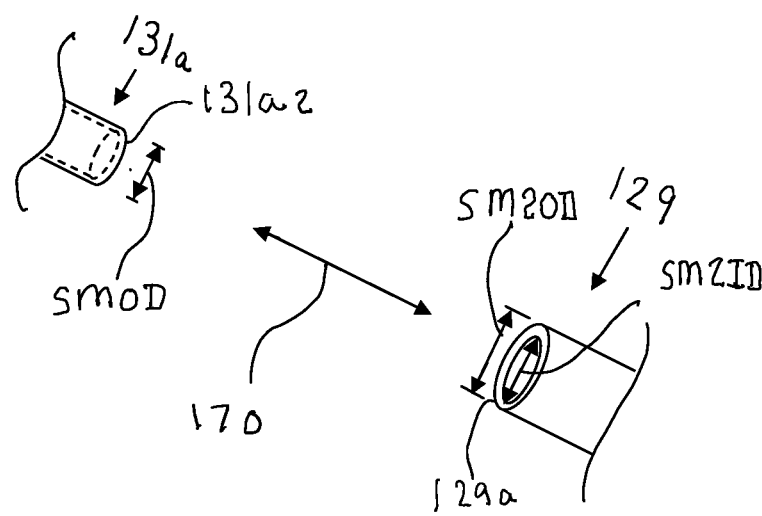
FIG. 19 is a prospective view of the width adjustment means and the length adjustment means of the of the yet another embodiment of the invention
Figure 19:
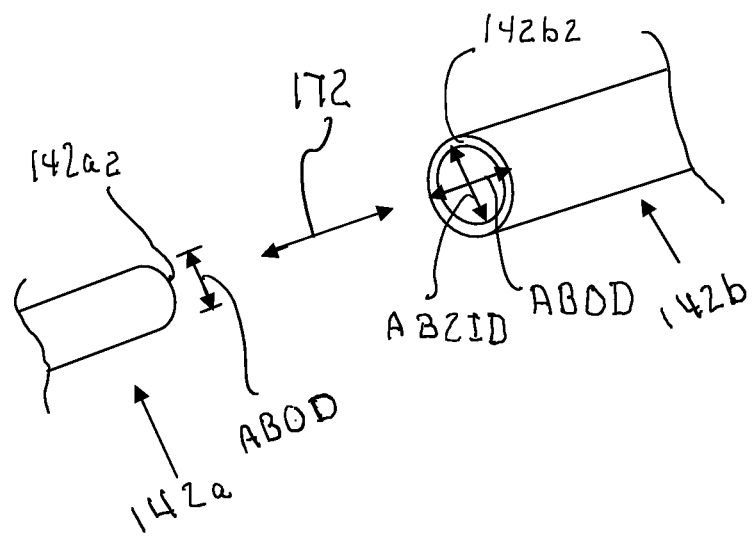

In yet another embodiment of the invention, a simple adjustable bed top 220 shown in FIG. 18, the simple adjustable canopy frame 222 does not have the slide slides 132 and the width slides 143 of the adjustable canopy frame 122 of FIG. 8A. Looking to FIGS. 18 and 19, the right corner front leg 141b, the right first arch bar 142b, the right second arch bar 144b, and the right third arch bar 146b of the simple adjustable canopy frame 222 each have an arch bar second inner diameter AB2ID larger that the arch bar outer diameter ABOD of the left corner front leg 131b, the left first arch bar 142a, the left second arch bar 144a, and the left third arch bar 146a, respectively; and the adjustable left side top portion 129 and the adjustable right side top portion 139 of the simple adjustable canopy frame 222 each have a side member second inner diameter SM2ID larger the side member outside diameter SMOD of the left corner side leg 131a and the right corner side 141a, respectively. Continuing to look to FIG. 19, a first side member of the simple adjustable canopy frame 222, such as the adjustable left side top portion 129, has the side member second inner diameter SM2ID that is larger than the side member outer diameter SMOD of the left corner side leg 131a. Thus, the distal end of a second side member, such as left corner side leg second end 131a2 of the left corner side leg 131a, may slide into the distal end of a first side member, such as adjustable left side top portion second end 129b of the adjustable left side top portion 129 providing for adjustments in the length direction 170. Similarly, looking again to FIG. 19, an exploded view of a second width member, such as the left first arch bar 142a, and a first width member, such as the right first arch bar 142b, the second width member has the arch bar second inner diameter AB2ID that is larger than the arch bar outer diameter ABOD of left first arch bar 142a. Thus, the distal end of a second width member, such as left first arch bar second end 142a2, slides into the distal end of the first width member, such as the right first arch bar second end 142b2 allowing for adjustment in the width direction 172. Once the simple adjustable canopy frame is adjusted in the width direction 172 and the length direction 170, the slide fasteners 181 shown in FIG. 10F may be used to hold the first side member and the second side member together, and the first width member and the second width member together.

Although the present invention has been described in considerable detail with reference to preferred versions thereof, other versions are possible. Therefore, the spirit and scope of the appended claims should not be limited to the description of the preferred versions contained herein. Various deviations and modification may be made within the spirit and scope of this invention without departing from the main theme thereof.

What is claimed is:

1. For mounting on a vehicle bed of a vehicle, a bed top comprising a canopy frame for a canopy; the canopy frame further comprising a top portion, an arch portion, and a rear portion; the bed top configured to cover contents placed on the vehicle bed when the vehicle is in motion; the arch portion joining the top portion to the rear portion; and the top portion cantilevered from the arch portion; and the top portion of the canopy frame being shaped and configured to mate the canopy to a vehicle cab top using a front mounting system; the bed top further comprising at least a leg mount; the leg mount comprising a cylindrical portion and a strap portion; the strap portion extending from the cylindrical portion;
the cylindrical portion being hollow and having at least a cantilever cutout that is folded into the cylindrical portion so as to be perpendicular to a cylindrical portion inner wall; the cylindrical portion sized to hold a rear telescopic support of the canopy frame;
the strap portion configured to mount the leg mount to the vehicle bed inner wall; the cantilever cutout configured to prevent the rear telescopic support inserted in an insert end of the leg mount from passing through the cylindrical portion and out of a strap end of the leg mount.

2. The bed top of claim 1 wherein the bed top is configured to rotate with the top portion positioned extending to a rear of the vehicle bed; and the bed top mounted on the vehicle bed.

3. The bed top of claim 1 wherein
the top portion further comprises a left side top portion, a top front portion, and a right side top portion; wherein
the arch portion further comprises a left side arch portion, right side arch portion, and at least a first arch bar; and wherein
the rear portion further comprises a left rear telescopic support having a left leg and a left leg extension, and a right rear telescopic support having a right leg and a right leg extension;
the rear portion mounted generally perpendicular to the vehicle bed when the bed top is mounted on the vehicle bed;
the top portion generally perpendicular to the rear portion;
the top front portion having a top front portion first end connected to a left side top portion first end of the left side top portion forming a left front corner; the top front portion having a top front portion second end connected to a right side top portion first end of the right side top portion forming a right front corner; the left side top portion having a left side top portion second end connected to a left side arch portion first end of the left side arch portion; the right side top portion having a right side top portion second end connected to a right side arch portion first end of the right side arch portion; the left side arch portion having a left side arch portion second end connected to a left leg first end of the left leg;

the right side arch portion having a right side arch portion second end connected to a right leg first end of the right leg;

the left leg extension having a left leg extension first end inserted in a left leg second end forming the left rear telescopic support;

the right leg extension having a right leg extension first end inserted in a right leg second end of the right leg forming the right rear telescopic support; the first arch bar having a first arch bar first end connected generally perpendicular to the left side arch portion and the first arch bar having a first arch bar second end connected generally perpendicular to the right side arch portion;

the left side top portion, the right side top portion, the left rear telescopic support, and the right rear telescopic support each having an eyebolt;

the left rear telescopic support and the right rear telescopic support configured to mount in a left leg mount and a right leg mount, respectively; and the left rear telescopic support and the right rear telescopic support mounting in the right leg mount and the left leg mount, respectively, when the top portion projects off a rear of the vehicle bed.

4. The bed top of claim 3 wherein the right side arch portion and the left side arch portion are each a 90 degree three-way fitting.

5. The bed top of claim 1 further comprising a left front telescopic support and a right front telescopic support; the left front telescopic support having a left front leg extension inserted in a left front leg; the right front telescopic support having a right front leg extension inserted in a right front leg; the left front telescopic support and the right front telescopic support being equivalent; and the left front telescopic support placed under a left front corner of the canopy frame and the right front telescopic support placed under a right front corner of the canopy frame when the bed top is removed from the vehicle bed.

6. For mounting on a vehicle bed of a vehicle, a bed top comprising a canopy frame for a canopy;

the canopy frame further comprising a top portion, an arch portion, and a rear portion;

the arch portion joining the top portion to the rear portion; and the top portion cantilevered from the arch portion;

the top portion further comprises a left side top portion, a top front portion, and a right side top portion;

the arch portion further comprising a left side arch portion, right side arch portion, and at least a first arch bar; and the rear portion further comprising a left rear telescopic support having a left leg and a left leg extension, and a right rear telescopic support having a right leg and a right leg extension;

the rear portion mounted generally perpendicular to the vehicle bed when the bed top is mounted on the vehicle bed;

the top portion generally perpendicular to the rear portion;

the top front portion having a top front portion first end connected to a left side top portion first end of the left side top portion forming a left front corner; the top front portion having a top front portion second end connected to a right side top portion first end of the right side top portion forming a right front corner; the left side top portion having a left side top portion second end connected to a left side arch portion first end of the left side arch portion; the right side top portion having a right side top portion second end connected to a right side arch portion first end of the right side arch portion;

the left side arch portion having a left side arch portion second end connected to a left leg first end of the left leg;

the right side arch portion having a right side arch portion second end connected to a right leg first end of the right leg;

the left leg extension having a left leg extension first end inserted in a left leg second end forming the left rear telescopic support;

the right leg extension having a right leg extension first end inserted in a right leg second end of the right leg forming the right rear telescopic support; the first arch bar having a first arch bar first end connected generally perpendicular to the left side arch portion and the first arch bar having a first arch bar second end connected generally perpendicular to the right side arch portion;

the left side top portion, the right side top portion, the left rear telescopic support, and the right rear telescopic support each having an eyebolt;

the left rear telescopic support and the right rear telescopic support configured to mount in a left leg mount and a right leg mount, respectively; and the left rear telescopic support and the right rear telescopic support mounting in the right leg mount and the left leg mount, respectively, when the top portion projects off a rear of the vehicle bed;

the right side arch portion and the left side arch portion are each a 90 degree three-way fitting;

the right leg mount being equivalent to the left leg mount; the left leg mount comprising a cylindrical portion and a strap portion;

the strap portion extending from the cylindrical portion;

the cylindrical portion being hollow and having at least a cutout that is folded into the cylindrical portion so as to be perpendicular to a cylindrical portion inner wall; and the cylindrical portion sized to hold the left rear telescopic support.

7. The bed top of claim 6 further comprising a left front telescopic support and a right front telescopic support; the left front telescopic support having a left front leg extension inserted in a left front leg; the right front telescopic support having a right front leg extension inserted in a right front leg; the left front telescopic support and the right front telescopic support being equivalent; and the left front telescopic support placed under a left front corner of the canopy frame and the right front telescopic support placed under a right front corner of the canopy frame when the bed top is removed from the vehicle bed.

8. For mounting on a vehicle bed of a vehicle, a bed top comprising a front mounting system and a canopy frame for a canopy; the canopy frame further comprising a top portion, an arch portion, and a rear portion; the bed top configured to cover contents placed on the vehicle bed when the vehicle is in motion; the arch portion joining the top portion to the rear portion; and the top portion cantilevered from the arch portion, the front mounting system configured for attachment to a roll cage of the vehicle; the front mounting system comprising a first cab mount bracket, a second cab mount bracket, a mount rail, and a rain seal; the first cab mount bracket and the second cab mount bracket being equivalent; the mount rail running from the first cab mount bracket to the second cab mount bracket; the first cab mount bracket configured to mount to a left rear vertical cage bar of the roll cage; the second cab mount bracket configured to mount to a right rear vertical cage bar of the roll cage; the mount rail configured sized to fit the vehicle; the mount rail having a left rail hole and a right rail hole, and a mount rail top edge;

the rain seal comprising a front rubberized portion joined to a back rubberized potion; the rain seal configured to be placed over the mount rail top edge of the mount rail; the front rubberized portion configured to be adjacent to a vehicle cap top of the vehicle; and the back rubberized portion configured to be adjacent to the canopy; the front mounting system further comprising at least one roller mount; the roller mount configured to support the top front portion of the canopy frame; the one roller mount mounted to at least the first cab mount bracket; and the roller mount configured to cradle a top front portion of the canopy frame.

9. The bed top of claim 8 wherein the bed top is configured to rotate with the top portion positioned extending to a rear of the vehicle bed.

10. The bed top of claim 8 further comprising at least one leg mount; the one leg mount comprising a cylindrical portion and a strap portion; the strap portion extending from the cylindrical portion;

the cylindrical portion being hollow and having at least a cantilever cutout that is folded into the cylindrical portion so as to be perpendicular to a cylindrical portion inner wall; the cylindrical portion sized to hold a left rear telescopic support of the canopy frame;

the strap portion configured to mount the one leg mount to a vehicle bed inner wall; the cantilever cutout configured to prevent the left rear telescopic support inserted in an insert end of the one leg mount from passing through the cylindrical portion and out of a strap end of the one leg mount.

11. The bed top of claim 8 further comprising a left front telescopic support and a right front telescopic support; the left front telescopic support having a left front leg extension inserted in a left front leg; the right front telescopic support having a right front leg extension inserted in a right front leg; the left front telescopic support and the right front telescopic support being equivalent; and the left front telescopic support placed under a left front corner of the canopy frame and the right front telescopic support placed under a right front corner of the canopy frame when the bed top is removed from the vehicle bed.

12. For mounting on a vehicle bed of a vehicle, a bed top comprising a canopy frame for a canopy; the canopy frame further comprising a top portion, an arch portion, and a rear portion; the bed top configured to cover contents placed on the vehicle bed when the vehicle is in motion; the arch portion joining the top portion to the rear portion; and the top portion cantilevered from the arch portion; the bed top further comprising at least a leg mount; the leg mount comprising a cylindrical portion and a strap portion; the strap portion extending from the cylindrical portion;

the cylindrical portion being hollow and having at least a cantilever cutout that is folded into the cylindrical portion so as to be perpendicular to a cylindrical portion inner wall; the cylindrical portion sized to hold a left rear telescopic support of the canopy frame;

the strap portion configured to mount the leg mount to the vehicle bed inner wall; the cantilever cutout configured to prevent the left rear telescopic support inserted in an insert end of the leg mount from passing through the cylindrical portion and out of a strap end of the leg mount.

13. For mounting on a vehicle bed of a vehicle, a bed top comprising a front mounting system and a canopy frame for a canopy; the canopy frame further comprising a top portion, an arch portion, and a rear portion; the bed top configured to cover contents placed on the vehicle bed when the vehicle is in motion;

the arch portion joining the top portion to the rear portion; and the top portion cantilevered from the arch portion, the front mounting system configured for attachment to a roll cage of the vehicle; the front mounting system comprises a first cab mount bracket, a second cab mount bracket, a mount rail, and a rain seal; the first cab mount bracket and the second cab mount bracket being equivalent; the mount rail running from the first cab mount bracket to the second cab mount bracket; the first cab mount bracket configured to mount to a left rear vertical cage bar of the roll cage; the second cab mount bracket configured to mount to a right rear vertical cage bar of the roll cage; the mount rail configured sized to fit the vehicle; the mount rail having a left rail hole and a right rail hole, and a mount rail top edge; the rain seal comprising a front rubberized portion joined to a back rubberized potion; the rain seal configured to be placed over the mount rail top edge of the mount rail; the front rubberized portion configured to be adjacent to a vehicle cap top of the vehicle; and the back rubberized portion configured to be adjacent to the canopy.

\* \* \* \* \*